W. LE G. BUNDY.
CALCULATING MACHINE.
APPLICATION FILED AUG. 18, 1902. RENEWED MAY 6, 1912.

1,113,099.

Patented Oct. 6, 1914.
10 SHEETS—SHEET 1.

WITNESSES:
Chas. J. Toner.
Chas. Young.

INVENTOR
Willard LeGrand Bundy,
BY
ATTORNEYS

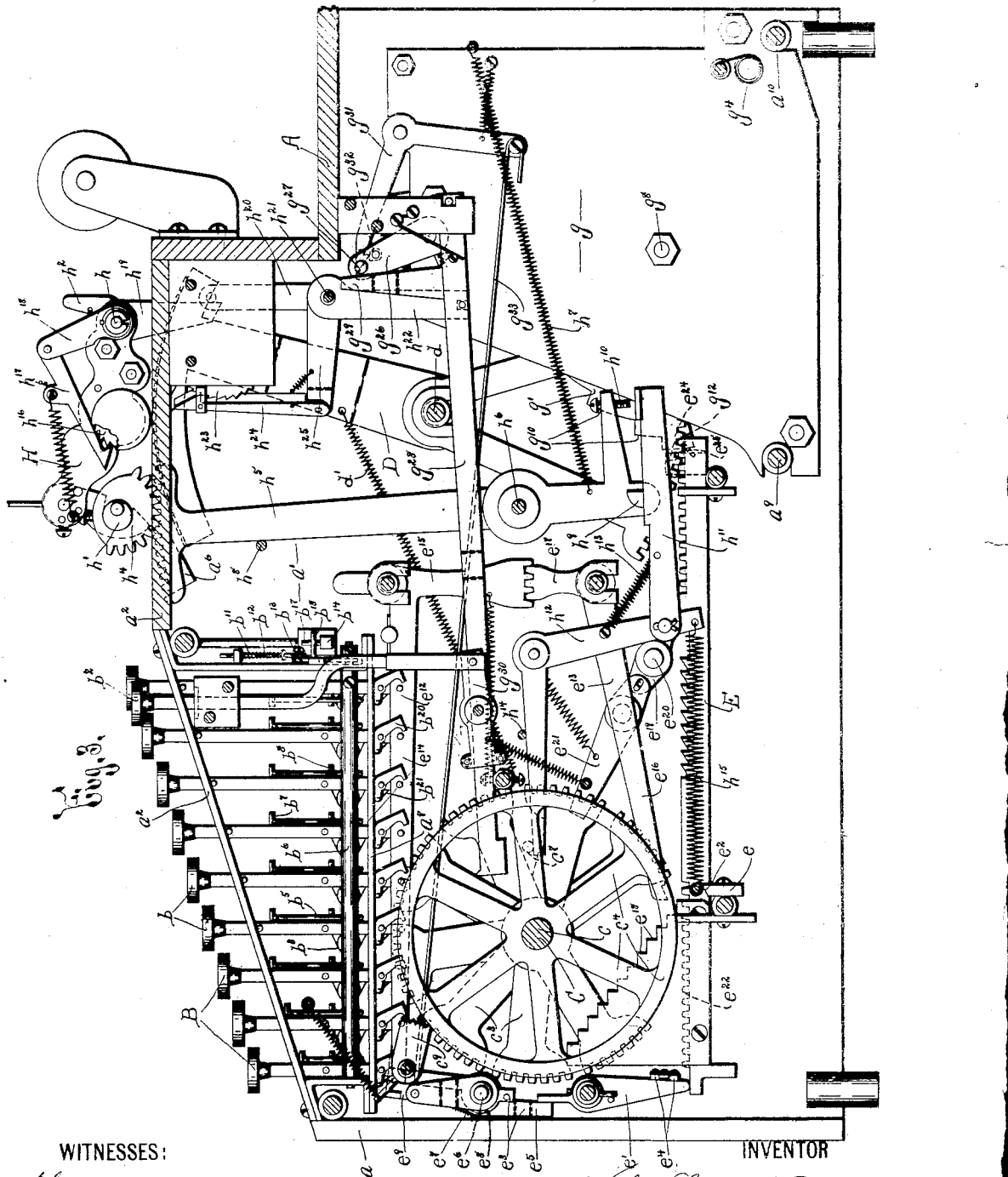

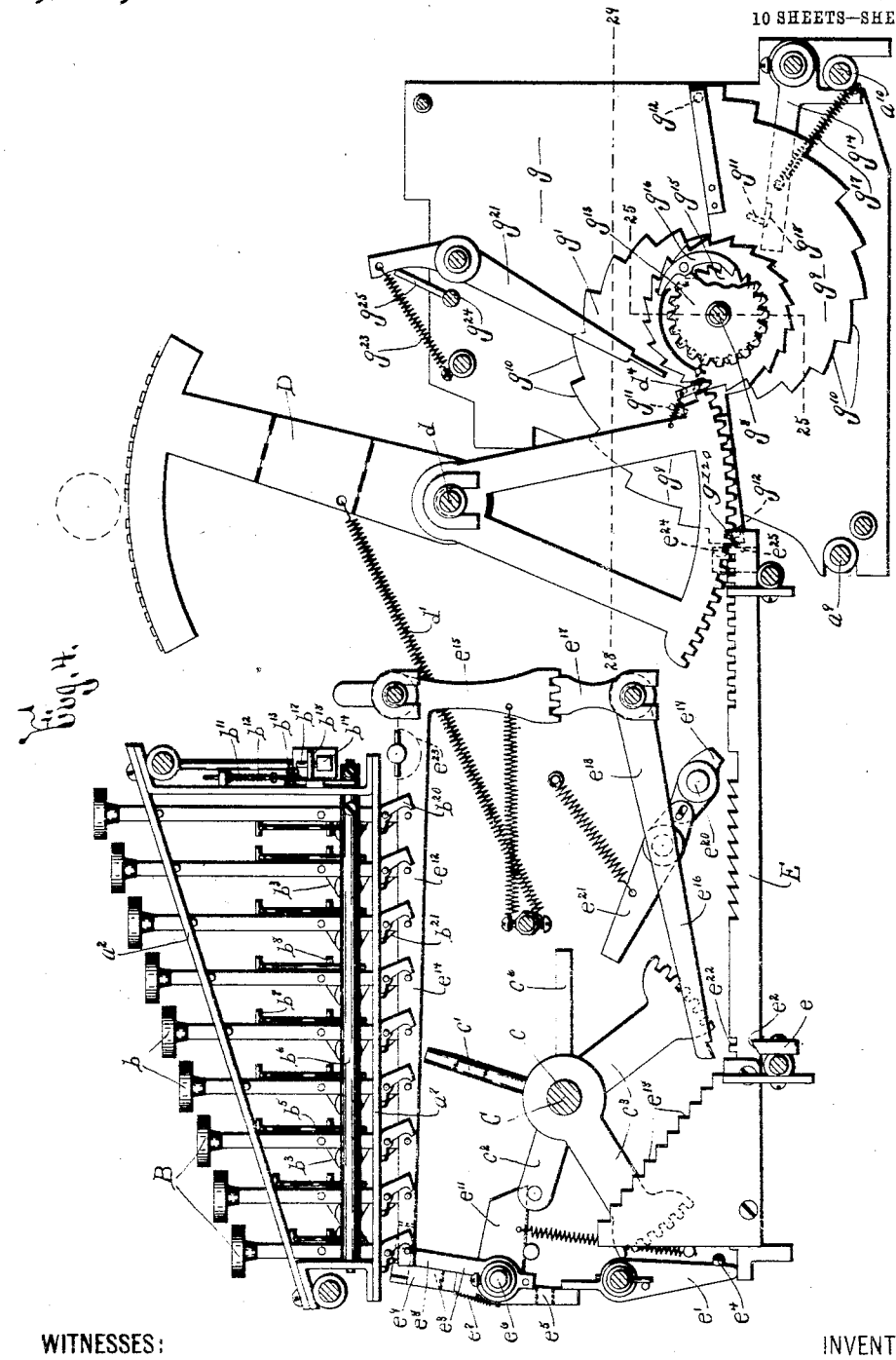

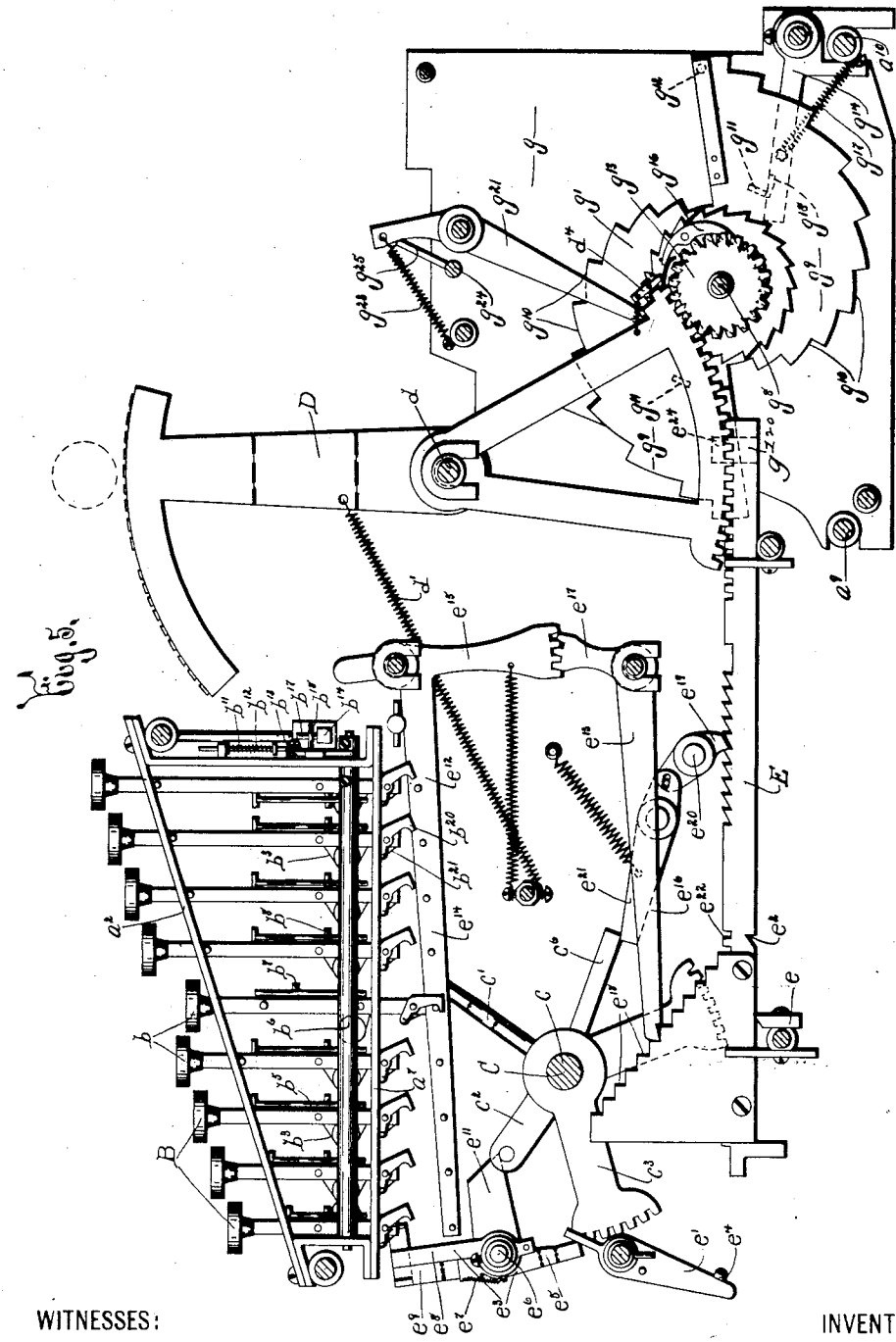

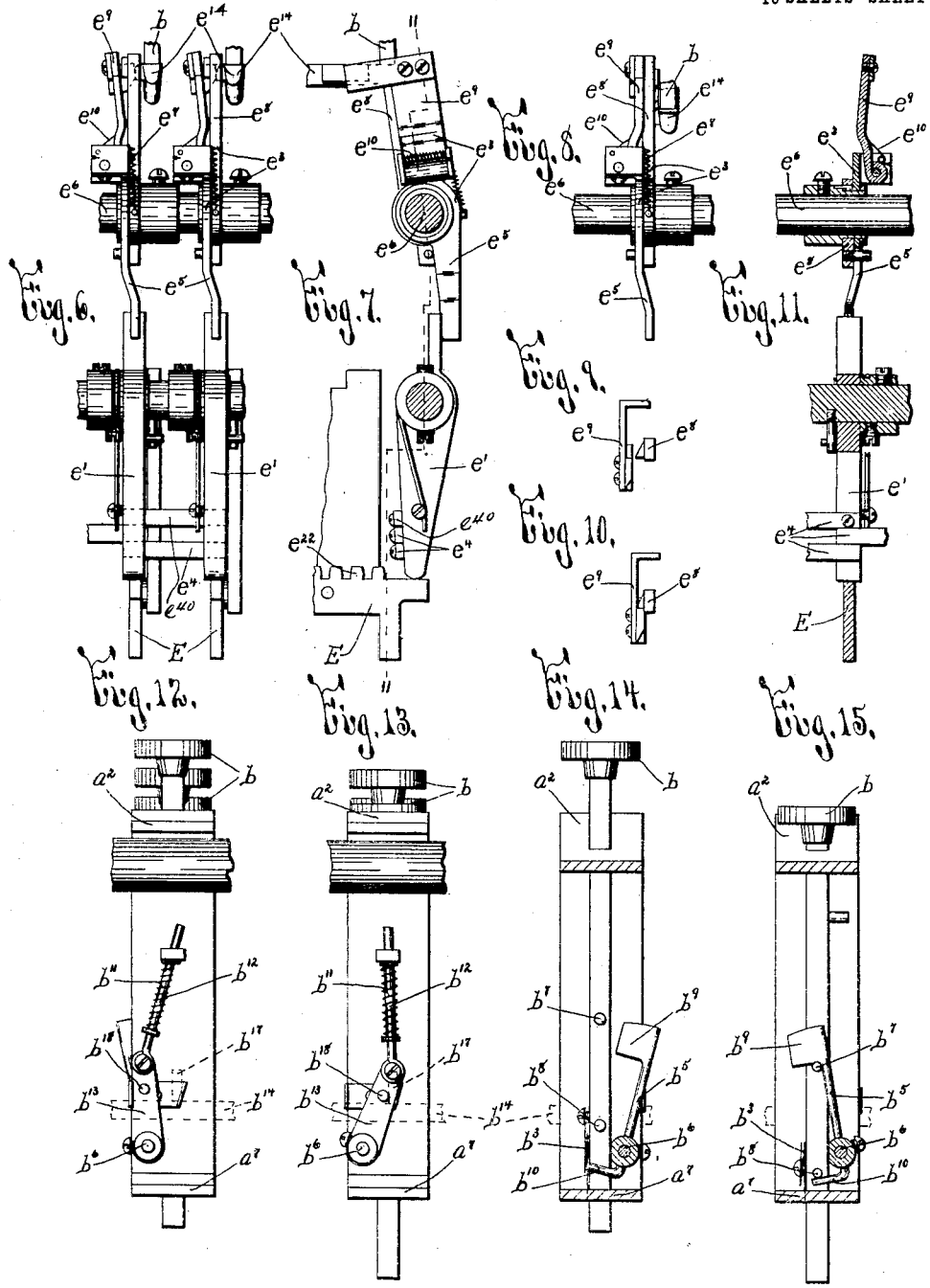

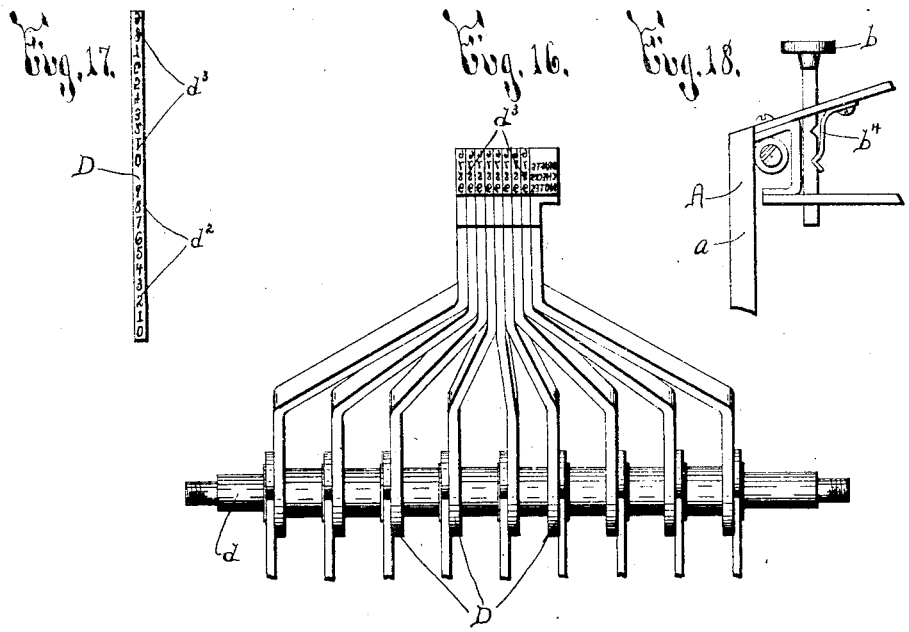
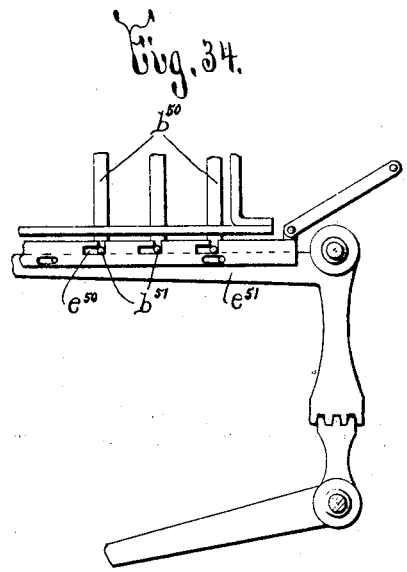
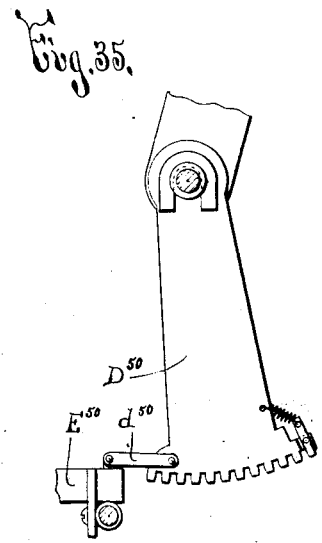

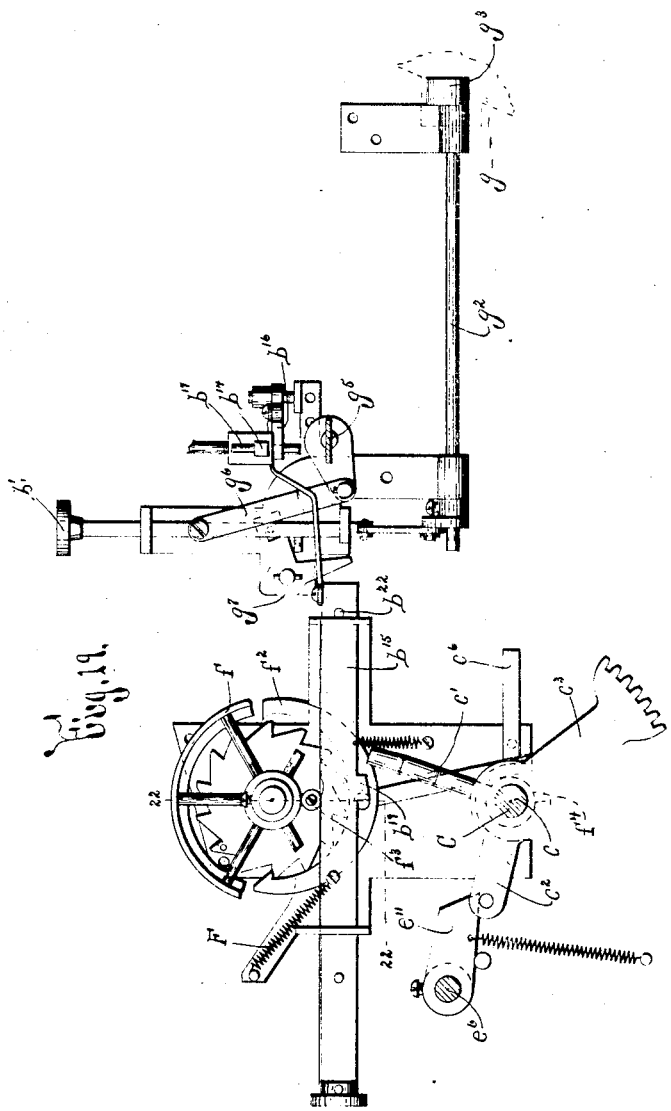

W. LE G. BUNDY.
CALCULATING MACHINE.
APPLICATION FILED AUG. 18, 1902. RENEWED MAY 6, 1912.
1,113,099.
Patented Oct. 6, 1914.
10 SHEETS—SHEET 8.
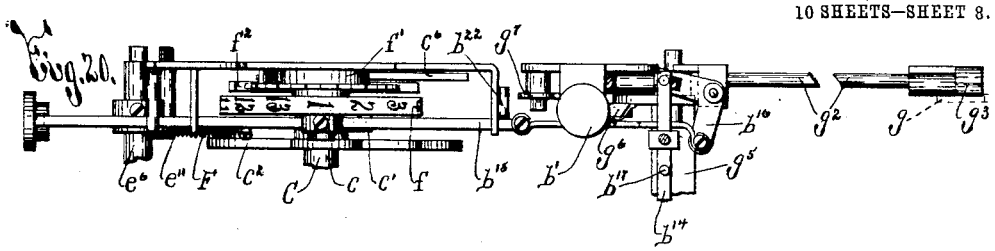
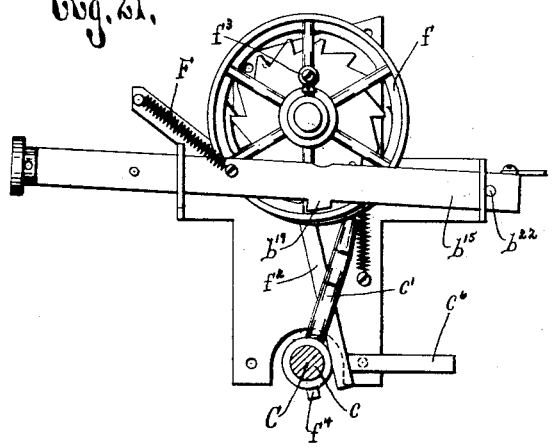
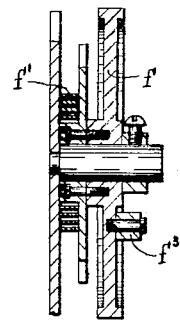
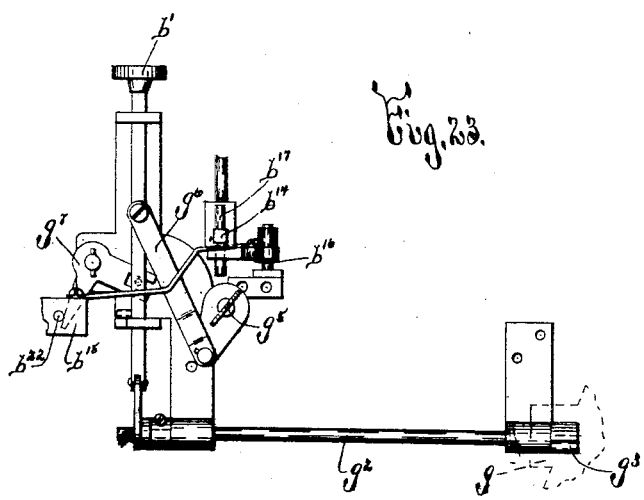
WITNESSES:
Chas. J. Toner.
Chas. Young.
INVENTOR
Willard Le Grand Bundy
BY
Hey & Parsons
ATTORNEYS W. LE G. BUNDY.
CALCULATING MACHINE.
APPLICATION FILED AUG. 18, 1902. RENEWED MAY 6, 1912.
1,113,099.
Patented Oct. 6, 1914.
10 SHEETS—SHEET 9.
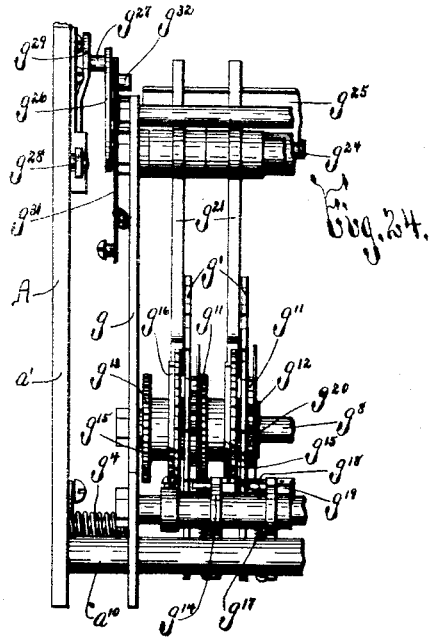
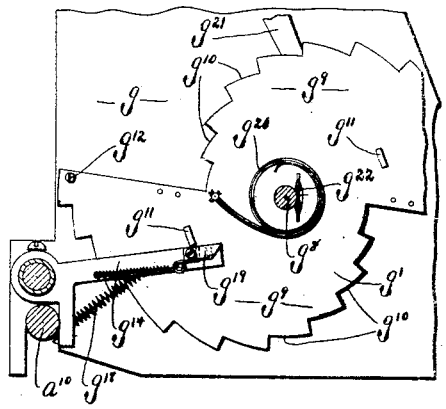
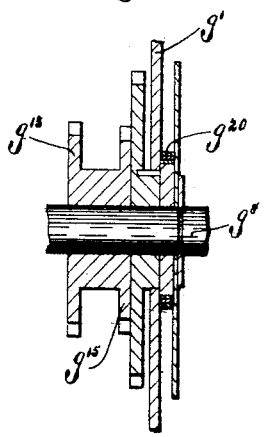
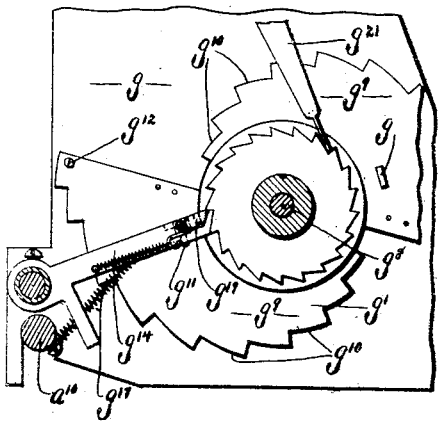
WITNESSES:
Chas. J. Foner.
Chas. Young.
INVENTOR
Willard LeGrand Bundy
BY
Steyr Parsons
ATTORNEYS W. LE G. BUNDY.
CALCULATING MACHINE.
APPLICATION FILED AUG. 18, 1902. RENEWED MAY 6, 1912.
1,113,099.
Patented Oct. 6, 1914.
10 SHEETS—SHEET 10.
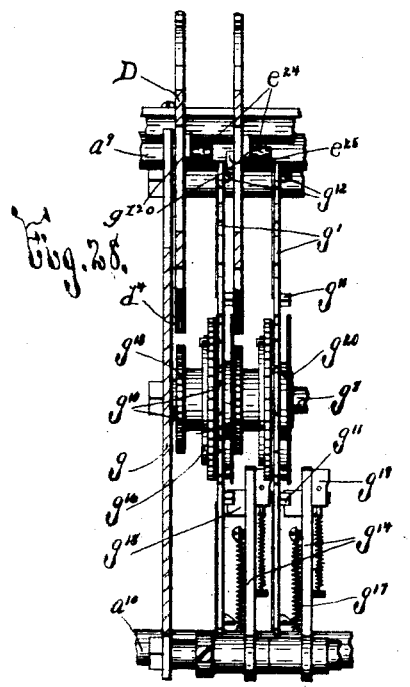
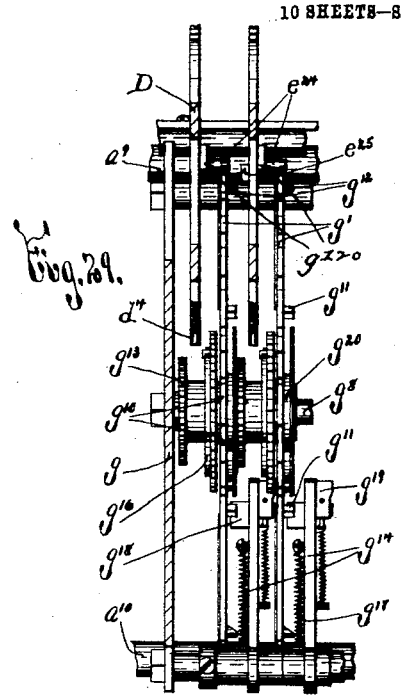
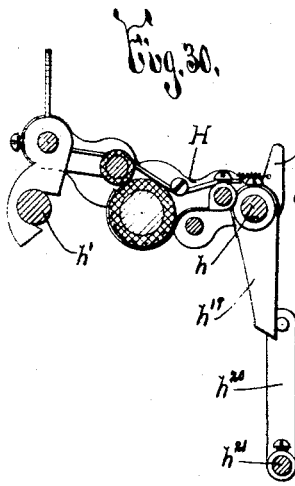
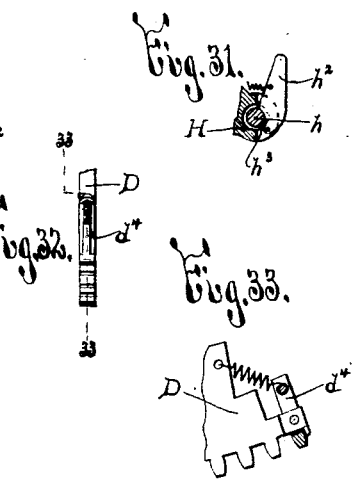
WITNESSES:
Chas. J. Jones.
Chas. Young.
INVENTOR
Willard LeGrand Bundy
BY
ATTORNEYS

UNITED STATES PATENT OFFICE.

WILLARD LE GRAND BUNDY, OF BINGHAMTON, NEW YORK, ASSIGNOR TO W. H. BUNDY RECORDING COMPANY, OF SYRACUSE, NEW YORK, A CORPORATION OF NEW YORK.

CALCULATING-MACHINE.

1,113,099.      Specification of Letters Patent.      Patented Oct. 6, 1914.

Application filed August 18, 1902, Serial No. 120,043. Renewed May 6, 1912. Serial No. 695,568.

*To all whom it may concern:*

Be it known that I, WILLARD LE GRAND BUNDY, of Binghamton, in the county of Broome and State of New York, have invented a certain new and useful Calculating-Machine, of which the following is a specification.

My invention has for its object the production of a calculating machine, which is particularly simple in construction and efficient in operation; and to this end, it consists in the combination, construction and arrangement of the component parts of a calculating machine, as hereinafter fully described and pointed out in the claims.

In describing this invention, reference is had to the accompanying drawings, in which like letters refer to corresponding parts in all the views.

Figure 1:
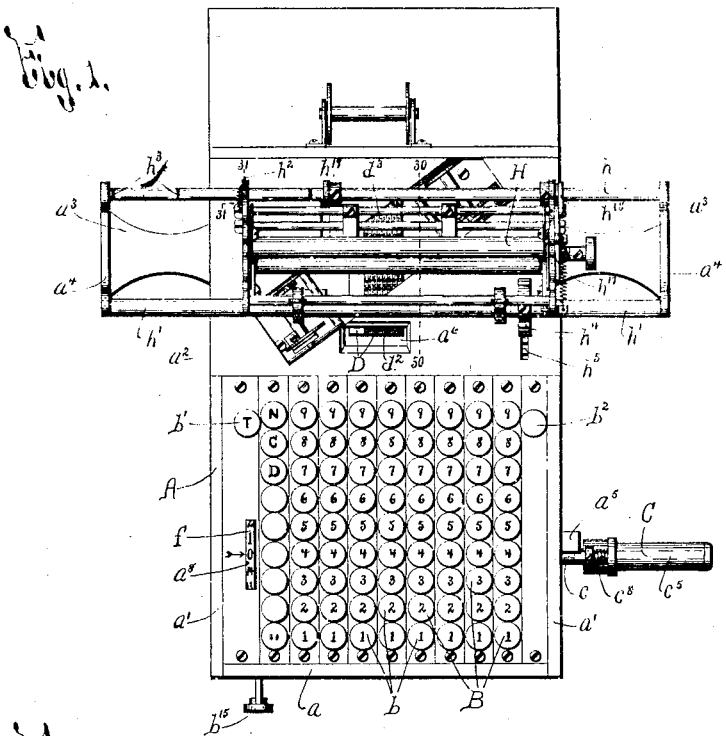
Figure 2:
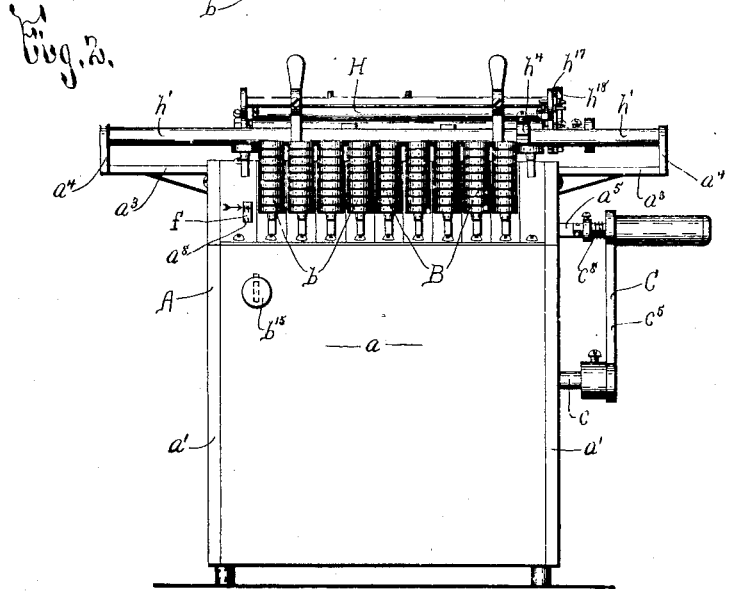

Figures 1 and 2 are, respectively, top plan and front elevation of a preferred embodiment of my invention. Fig. 3 is a side elevation of the machine seen in Figs. 1 and 2, portions of the frame being removed or shown in section, and parts of said machine at the inner side of the illustrated mechanism being omitted. Fig. 4 is an elevation similar to Fig. 3, a number of the parts seen in Fig. 3 being omitted. Fig. 5 is an elevation similar to Fig. 4, one of the keys being shown as depressed. Fig. 6 is a front elevation of corresponding ends of two of the controlling members, the means for holding said controlling members in their normal position in engagement with stops therefor, the power-transmitting devices for forcing said means from operative position, and contiguous portions of the movable parts or levers coöperating with said power-transmitting devices and the corresponding series of keys. Fig. 7 is a side elevation of the parts seen in Fig. 6. Fig. 8 is a front elevation of one of the power-transmitting devices illustrated in Fig. 6, and a contiguous portion of the movable part or lever coöperating therewith. Figs. 9 and 10 are plan views of the upper end of the power-transmitting device shown in Fig. 8. Fig. 11 is a sectional view taken on line 11—11, Fig. 7. Figs. 12 and 13 are face views of one of the means for holding the locking members for the keys in their inoperative and operative positions and contiguous parts of the machine. Figs. 14 and 15 are detail views illustrating one of said locking members, the corresponding key and contiguous parts of the machine. Fig. 16 is a rear view of the upper parts of the recording members. Fig. 17 is a plan of the upper portion of one of the recording members. Fig. 18 is a detail view of the "ditto" key, the locking member therefor, and contiguous parts of the machine. Fig. 19 is an elevation of the multiplying mechanism and the means for moving laterally the carriage for the calculating mechanism. Fig. 20 is a plan view of the mechanism shown in Fig. 19. Fig. 21 is an elevation of the detached multiplying mechanism. Fig. 22 is a sectional view taken on line 22—22, Fig. 19. Fig. 23 is an elevation of the detached means for moving laterally the carriage for the calculating mechanism. Fig. 24 is a rear view of a portion of the calculating mechanism and contiguous parts of the machine. Fig. 25 is a sectional view taken on line 25—25, Fig. 4. Figs. 26 and 27 are side elevations of parts of the calculating mechanism. Figs. 28 and 29 are sectional views taken on line 28—29, Fig. 4, the illustrated portions of the calculating mechanism and its carriage being shown in their normal position in Fig. 28 and as moved laterally in Fig. 29. Figs. 30 and 31 are sectional views taken, respectively, on line 30—30 and 31—31, Fig. 1. Fig. 32 is an edge view of a portion of the lower part of one of the recording members. Fig. 33 is a sectional view taken on line 33—33, Fig. 32. Fig. 34 is a detail view of a modified means for connecting the keys and the movable parts or levers coöperating therewith. Fig. 35 is an elevation of a modified means for connecting the recording and controlling members.

The illustrated embodiment of my invention comprises a frame, a keyboard, an actuating part, recording and controlling members, and multiplying, calculating and printing mechanisms. It will be understood, however, that one or more of said parts may be dispensed with, if desired.

The frame A is of any suitable form, size and construction, being here shown, Figs. 1 and 2, as provided with front and side walls $a$, $a'$ $a'$ and a top $a^2$, said side walls having lateral extensions $a^3$ formed with upwardly projecting arms $a^4$.

The keyboard B may also be of any desirable form, size and construction, and is here illustrated as consisting of a plurality of keys $b$ $b'$ $b^2$ movable vertically in the front portion of the top $a^2$ of the frame A. Said keys $b$ are arranged in a plurality of series, and with the exception of the front key of the lefthand series are normally elevated by spring $b^3$. As best seen in Figs. 3, 4 and 5, the upper ends of the keys of each series of the keys $b$ are arranged one above the other from the front to the rear of the keyboard; and as best seen in Fig. 1, the keys $b'$ $b^2$ are disposed at the outer sides of the lefthand and righthand series of keys $b$. It is obvious, however, that my invention is not limited to the particular arrangement of keys shown and described. Said front key of the lefthand series of keys $b$ is termed "ditto" key, is provided with a plurality of shoulders, is held in either its elevated or depressed positions by a yielding stop $b^4$, Fig. 18, fixed to the frame A and detachably engaging the shoulders of said key, and is forced to its different positions by hand. The remaining keys of the lefthand series of keys $b$ are usually provided with, and distinguished by, suitable words, as notes, checks, drafts, etc. All of the keys $b$, with the exception of said "ditto" key, are held in position by locking members $b^5$, the locking members for each series of keys being fixed to a common shaft or rod $b^6$. As clearly shown in Figs. 14 and 15, each of the keys $b$ coöperating with a locking member $b^5$ is provided with separated shoulders $b^7$ $b^8$, which respectively engage arms $b^9$ $b^{10}$ projecting from the corresponding locking member $b^5$ at opposite sides of the shaft or rod $b^6$ forming the pivot for said locking member, said arms $b^{10}$ being normally in position to be engaged by the shoulders $b^8$, Fig. 14. When one of the keys $b$ is depressed to its operative position, the lower shoulder $b^8$ thereof encounters the upper surface of the lower arm $b^{10}$ of the corresponding locking member $b^5$, and forces the lower surface of the arm $b^9$ of said locking member into engagement with the top face of the upper shoulder $b^7$ of said key, as seen in Fig. 15. At the same time, the top surfaces of the upper arms $b^9$ of the locking members for the remaining keys of the series of keys including said depressed key, are engaged with the lower faces of the upper shoulders $b^7$ of said keys, thus preventing downward movement of any additional key of said series.

As best seen in Figs. 12 and 13, the locking members $b^5$ of each series, are held in their inoperative and operative positions by springs $b^{11}$ which are mounted, respectively, on supports $b^{12}$ each having one end pivotally supported on the frame of the keyboard, and its other end pivoted to an arm $b^{13}$ fixed to the corresponding shaft $b^6$, the pivot for uniting the contiguous ends of said support and arm being movable on opposite sides of a line drawn through the axes of the corresponding shaft $b^6$, and the support $b^{12}$. As the actuating part C reaches the limit of its motion, the locking members $b^5$ are all forced to their normal or inoperative position by means, here shown, Figs. 19, 20 and 21, as consisting of a pair of sliding bars $b^{14}$ $b^{15}$ arranged at an angle with each other and a lever $b^{16}$ connecting said bars for transmitting motion from one to the other. The bar $b^{14}$ carries a series of shoulders $b^{17}$, Figs. 12 and 13, for engaging shoulders $b^{18}$ on the arms $b^{13}$, and the bar $b^{15}$, Figs. 1 and 2, is extended through the front wall $a$ of the frame and provided with a suitable hand-piece. The central portion of the bar $b^{15}$, Fig. 19, is formed with a depending shoulder $b^{19}$, which is engaged by an arm $c'$ on the actuating part C when reaching the limit of its complete operation.

The actuating part C, Figs. 1, 2, 3, 4, 5, 19, 20 and 21, preferably moves relatively to the keys B and the means for limiting the movement of the controlling members, and consists of a shaft $c$, arms $c'$ $c^2$ $c^3$ $c^6$, a drum $c^4$ and a hand-piece $c^5$. The shaft $c$ is journaled in the side walls $a'$ $a'$ of the frame A; the arms $c'$ $c^2$ $c^3$ $c^6$ project substantially radially from the shaft $c$; the drum $c^4$ is formed with a substantially smooth peripheral face and with a lateral shoulder $c^7$, Fig. 3, and the hand-piece $c^5$, Figs. 1 and 2, is provided with a longitudinally-yielding shoulder $c^8$ which encounters a stop or shoulder $a^5$ on the frame A for limiting the movement of the actuating part at each complete operation or rotation thereof, and is movable laterally out of engagement with the stop or shoulder $a^5$ for permitting the actuating part to commence an additional operation or rotation. Retrograde movement of the actuating part is prevented by a pivoted stop-pawl $c^9$, Fig. 3, engaging the substantially smooth peripheral face of the drum $c^4$.

As illustrated in Figs. 1, 3, 4, 5 and 16, the recording members D consist of rocking parts having their upper portions arranged in close proximity and their intermediate and lower portions separated. Said recording members are pivoted on a shaft $d$, are held in their normal position by the controlling members E, and are drawn to their predetermined position by independently-operating springs $d'$. The upper face of each of the recording members D is provided with two series of indicating characters $d^2$ $d^3$, Fig. 17, the series $d^2$ registering with an observation-opening $a^6$ in the frame A, and the other series $d^3$ registering with the portions of the record-sheet for receiving the predetermined impression or record.

The controlling members E, Figs 3, 4, 5, 6 and 7, govern the setting of the recording members D and as usually constructed, consist of longitudinally reciprocating bars. Corresponding ends of the controlling members are pivotally supported and are provided with gear-teeth normally meshing with similar teeth on the lower faces on parts of the recording members D. The opposite ends of the controlling members E coöperate with means for preventing movement of the controlling members from their normal position, means for limiting the movement of said members, and means for returning the members E to their normal position.

As generally constructed, the means for holding the controlling members E in their normal position consists of fixed stops $e$ and rocking levers $e'$, Fig. 3. The stops $e$ normally enter notches $e^2$ in the lower edges of the controlling members E, and when the controlling members are withdrawn from their normal position, the stops $e$ engage the portions of said lower edges in front of the notches $e^2$, and elevate the front ends of the controlling members thus moving said front ends in a plane disposed at substantially right angles with the plane of the longitudinal movement of said controlling members. The rocking levers $e'$ hold the controlling members E in their normal position in engagement with the stops $e$, are forced from their normal position by independently-operating power-transmitting devices $e^3$, and with the exception of the righthand lever $e'$, are each provided with an arm $e^4$, which projects laterally from the right hand side thereof and rocks the adjacent lever $e'$ from its normal position when it is desired to have the recording member corresponding to said adjacent lever print a cipher at the righthand of a digit. Said righthand lever $e'$ is provided with an arm $e^{40}$, Figs. 6 and 7, projecting from its lefthand side for engaging the next adjacent lever $e'$ when it is desired to print a cipher at the lefthand of a digit. Each power-transmitting device $e^3$ consists of a rocking section $e^5$ normally engaged with one of the levers $e'$, loosely mounted on a shaft $e^6$, and held in its normal position by a spring $e^7$, a second rocking section $e^8$ fixed to the shaft $e^6$, and having its axis substantially coincident with that of the section $e^5$, a connection $e^9$ between the sections $e^5$ $e^8$ for locking said sections together, and a spring $e^{10}$ for automatically forcing the connection $e^9$ into its operative position. Said connection $e^9$ is here illustrated as an arm pivoted, Fig. 11, to the section $e^5$ and provided with a tooth, Figs. 9 and 10, movable laterally into engagement with a corresponding tooth on the section $e^8$, but it is obvious that any other desirable connection may be used to transmit motion from the section $e^8$ of said power-transmitting device. The shaft $e^6$ is provided with a suitable arm $e^{11}$ operated by the arm $c^2$ of the actuating part C.

The means for limiting the movement of the controlling members E is here shown as consisting of movable parts or levers $e^{12}$ $e^{13}$ between the keys and the controlling members E movable relatively to the controlling members into a plurality of positions, one lever $e^{12}$ being provided for each series of keys, and one lever $e^{13}$ for each controlling member. Each movable part or lever $e^{12}$ is pivoted at one end of the corresponding series of keys, and is provided with a substantially horizontal forwardly-extending arm $e^{14}$ arranged directly beneath the lower ends of said series of keys and with a rear depending toothed arm $e^{15}$. By pivoting each movable part or lever $e^{12}$ at one end of the corresponding series of keys, the lower ends of the keys coöperating with said movable part or lever are unequally separated from the pivot of the part or lever $e^{12}$ and, consequently, uniform depression of the keys will rock said part or lever unequal distances on its pivot relatively to the corresponding controlling member. The front ends of the arms $e^{14}$ of the movable parts or levers $e^{12}$ normally rest against rearwardly extending arms of the connections $e^9$, as seen in Fig. 6, for forcing said connections from their operative position, and holding the teeth thereon out of engagement with the teeth of the sections $e^8$, and as soon as one of the movable parts or levers $e^{12}$ is rocked from its normal position, the spring $e^{10}$ of the corresponding power-transmitting device $e^3$ forces into its operative position in engagement with the section $e^8$ of said device the connection $e^9$ previously held out of operative position by the front end of said movable part or lever.

As best seen in Figs. 3, 4 and 5, the lower ends of the keys coöperating with the parts or levers $e^{12}$ are formed with any desirable means, as catches $b^{20}$, which are normally arranged in their inoperative position out of engagement with the arms $e^{14}$ and serve to connect a key, when depressed, to the arm $e^{14}$ of the corresponding movable part or lever $e^{12}$. In the preferable construction of my invention, the catches $b^{20}$ are pivoted to the lower ends of the keys $b$, are forced to their operative position by springs $b^{21}$, are normally rocked from their operative position by engagement with the bar $a^7$ through which the lower ends of the keys $b$ are guided, and are provided with shoulders for detachably engaging laterally-projecting shoulders on the movable parts or levers $e^{12}$. By connecting the depressed key to the corresponding movable lever or part $e^{12}$, it is possible to return said part or lever to its normal position when, for any reason, the operator decides to elevate said key by moving the sliding bar $b^{15}$ rearwardly. Consequently, when a key previously depressed is returned to its elevated position before the machine is actuated, the means coöperating with said key to limit the movement of the corresponding controlling member E is simultaneously and positively returned with the key.

Each movable part or lever $e^{13}$ is also pivoted at one end of the corresponding series of keys, and is formed with a substantially horizontal forwardly-extending arm $e^{16}$ and with a rear upwardly-extending toothed arm $e^{17}$ normally engaged with the toothed arm $e^{15}$ of the corresponding movable part or lever $e^{12}$. The front end of the arm $e^{16}$ of each movable part or lever $e^{13}$ coöperates with a series of shoulders $e^{18}$ which are provided on the corresponding controlling member E, are arranged in steps one below and in advance of the other, and are also arranged in front of the pivot for said lever $e^{13}$ when the controlling member is in its normal position. Said front ends of the arms $e^{16}$ are normally separated from the lower and rear or advance shoulders of the controlling members for permitting the controlling members, when released, to make a single advance, whereupon the further movement thereof will be restrained by the arms $e^{16}$. This single advance of one of the controlling members E will be permitted when the rocking lever $e'$ for holding the same in its locked position is forced from operative position by the engagement with said rocking lever of the lateral arm $e^4$ provided on the next adjacent rocking lever $e'$ to the left. At the same time, and without depression of any of the keys in the corresponding series of keys, all of the controlling members E to the right of said one of the controlling members will be similarly released and will make a single advance. Upon the first advance of any of the controlling members, the corresponding recording members will be moved so as to aline the ciphers thereon with the observation-opening $a^6$ and the printing point. It will be understood, that upon the movement of the righthand lever $e'$, controlled by the depression of one of the corresponding series of keys, the arm $e^{40}$ projecting from the lefthand side of said lever will actuate the next adjacent lever $e'$ whereupon the corresponding controlling member will make a single advance. In case one of the keys of a series of keys is depressed, the movement of the part or lever $e^{12}$ effected by the depression of said key, as previously described, elevates the front end of the arm $e^{16}$ of the part or lever $e^{13}$ coöperating therewith relatively to the controlling members and alines said front end with the shoulder $e^{18}$ corresponding to the depressed key, and, consequently, the predetermined characters of the corresponding recording member are alined with the observation-opening $a^6$ and the printing point, when said controlling member is released and is drawn rearwardly relatively to the parts or levers $e^{12}$ $e^{13}$ by the spring $d'$ until its further rearward movement is limited by said part or lever $e^{13}$.

In order to secure exact alinement with the printing point of the predetermined characters on the recording members D, I usually provide my invention with means for moving the controlling members E into their operative position after the same have set the recording members in the predetermined positions and just before the printing takes place. This means is here illustrated, Figs. 3, 4 and 5, as pivoted pawls $e^{19}$ fixed to a rock-shaft $e^{20}$, and having corresponding ends movable into engagement with teeth on the intermediate portions of the controlling members E, and a lever $e^{21}$ having one end connected to one of the pawls and its other end arranged in the path of the arm $c^6$ of the actuating member C.

As best seen in Figs. 3, 4 and 5, the means for returning the members E to their normal position, consists of the arms $c^3$ of the actuating member C, which are arranged one in advance of the other from the left to the right for returning the controlling members successively, and are provided at their lower faces with gear-teeth for engaging teeth $e^{22}$ upon the controlling members E. When the controlling members E are in their normal position, the arms $c^3$ swing above the teeth $c^{22}$ without engaging therewith, but after said controlling members have been moved from their normal position and their front ends have been elevated by the stops $e$, the arms $c^3$ operatively engage the teeth $e^{22}$.

The multiplying mechanism, Figs. 1, 19, 20, 21 and 22, generally consists of means which controls the transmission of power from the actuating part C to the means for forcing from their operative position the locking members $b^5$ for the keys $b$, and prevents the transmission of power from said actuating part to the locking members until after the actuating part has made a predetermined number of complete rotations or operations sufficient to force the locking members from their operative position. As here illustrated, the multiplying mechanism consists of a spring F, a rotary wheel $f$, a spring $f'$, and an escapement $f^2$. The spring F tends to elevate the sliding bar or plunger $b^{15}$ above its position assumed when about to be operated by the arm $c'$ of the actuating part C, and when said sliding bar or plunger $b^{15}$ is elevated by the spring F, Fig. 21, the actuating part C revolves without reciprocating said bar or plunger and causing the same to force the locking members $b^5$ from their operative position.

As best seen in Fig. 1, the wheel $f$ is alined with an opening $a^8$ in the top $a^2$ of the frame A, and is provided on its periphery with a plurality of characters, as the cipher and the numerals 1 to 14, inclusive, although the exact number of numerals is immaterial. Said wheel $f$ is movable by hand in one direction and is also provided with a laterally-projecting arm $f^3$ which, as shown in Fig. 19, normally holds the sliding bar or plunger $b^{15}$ in its position assumed when about to be operated by the actuating part C. The spring $f'$ returns the wheel $f$ to its normal position, and the escapement $f^2$ causes the return movement of the wheel $f$ by the spring $f'$ to take place step by step. Said escapement is actuated by a cam $f^4$ on the actuating part C. When the wheel $f$ is set so that its cipher is alined with the central portion of the opening $a^8$, or other predetermined starting point for the wheel $f$, the arm $f^3$ holds the sliding bar or plunger $b^{15}$ in its normal position, and said bar or plunger is operated by the actuating part C as said actuating part reaches the limit of each complete rotation or operation. If the wheel $f$ is moved so that the character or numeral 2 is alined with the starting point of said wheel, the arm $f^3$ is elevated two steps above the normal position of the sliding bar or plunger $b^{15}$, the spring F elevates said bar or plunger, and the actuating part C makes one complete revolution without actuating the bar or plunger $b^{15}$. Consequently, the keys previously depressed remain in position to effect a second record in accordance therewith upon the next movement of the actuating part. During the first rotation of the actuating part, the cam $f^4$ operates the escapement $f^2$ and causes the wheel $f$ to make a single advance step, and during the second rotation of the actuating part, the cam $f^4$ again operates the escapement $f^2$, whereupon the wheel $f$ makes a second step, and its arm $f^3$ moves the sliding bar or plunger $b^{15}$ into its normal position. Consequently, as the actuating part reaches the limit of its second rotation or complete operation, the arm $c'$ operates the sliding bar or plunger $b^{15}$ for forcing the locking members $b^5$ from their operative position and releasing the keys previously held depressed thereby.

In order that the operation of my multiplying mechanism may be clearly understood, suppose that it is desired to multiply 222 by 34: The units, tens and hundreds keys 2 are depressed and the wheel $f$ is set so that the numeral 4 is at the starting point of said wheel; the actuating part C is operated, and as the same completes the limit of its fourth rotation or operation, the keys previously depressed are elevated; the tens, hundreds and thousands keys 2 are then depressed and the wheel $f$ is set so that the numeral 3 is in the position formerly occupied by the numeral 4, whereupon the actuating part is operated, and as the same reaches the limit of its third operation, the keys last depressed are elevated. The number 222 will then be multiplied by 34, as will be obvious to those skilled in the art.

The calculating mechanism, Figs. 3, 4, 5, 19, 20 and 23 to 29 inclusive, as generally constructed, consists of a carriage $g$, means for moving the carriage laterally, calculating members $g'$, and means for effecting and controlling the return of said calculating members to their normal position. The carriage $g$ is of any suitable form, size and construction, and is movable laterally on guides $a^9$ $a^{10}$, Figs. 3, 4, 5, 28 and 29, by any desirable means, Figs. 19, 20 and 23, consisting preferably of a rock-shaft $g^2$ having one end provided with a cam $g^3$ for engaging and forcing the carriage laterally and its other end suitably connected to the key $b'$. A spring $g^4$, Fig. 24, forces the carriage $g$ to its normal position, and upon the depression of the key $b'$, Fig. 23, the rock-shaft $g^2$ and its cam $g^3$, Figs. 19, 20 and 23, move the carriage $g$ to the right against the action of the spring $g^4$.

The key $b'$ which 1 term the "total" key is connected to all the movable parts or levers $e^{12}$ except the lefthand part or lever $e^{12}$ for forcing said parts $e^{12}$ from their normal position when the key $b'$ is depressed, and is also connected to the sliding bar or plunger $b^{15}$ in order that when said bar or plunger is operated by hand or by the actuating part C, the key $b'$ may be raised to its normal position.

As here illustrated, the connections between the key $b'$ and all of the movable parts or levers $e^{12}$ except the lefthand part or lever $e^{12}$ consists of a rock-shaft $g^5$, Fig. 19, and a link $g^6$ connecting said rock-shaft to the key $b'$. The rock-shaft $g^5$ is provided with a flattened portion which rests upon the upper edges of the movable parts or levers $e^{12}$, Figs. 3 and 4, coöperating therewith in close proximity to the pivots therefor, and rocks said parts or levers for simultaneously elevating the front ends of the corresponding movable parts or levers $e^{13}$ above the uppermost shoulders $e^{18}$ of the controlling members E, in order that when the key $b'$ is depressed, the means for limiting the movement of the corresponding controlling members E may be out of operative position. I prevent the movement of the lefthand part or lever $e^{12}$ by providing its upper edge with a cutout $e^{23}$, indicated by dotted lines Fig. 4, which receives the flattened portion of the rock-shaft $g^5$. By preventing the movement of the lefthand part or lever $e^{12}$ by the key $b'$ I can operate said part or lever by any of the corresponding or lefthand series of keys except the "ditto" key whenever it is desired to record the words notes, checks, drafts, etc., in connection with the number or total accumulated by the calculating mechanism. The connections between the key $b'$ and the sliding bar or plunger $b^{15}$ generally consist of a lever $g^7$, Fig. 19, having an arm connected to the key $b'$ and a second arm depending into the path of a shoulder $b^{22}$ on the bar or plunger $b^{15}$. When the key $b'$ has been depressed, the rearward movement of the sliding bar or plunger $b^{15}$ effected either by hand or by the rotation of the actuating part C engages the shoulder $b^{22}$ with the depending arm of the lever $g^7$ and thus rocks the lever $g^7$ and elevates said key to its normal position.

The calculating members $g'$ are here shown as wheels, Fig. 26, loosely mounted on a shaft $g^8$ and each provided with opposite substantially similar parts or halves $g^9$ each formed with a plurality of shoulders $g^{10}$ which are arranged one in advance of the other at unequal distances from the shaft $g^8$, are moved successively into position to be engaged by a shoulder $e^{24}$ upon the corresponding controlling member E, are normally out of alinement with said shoulder $e^{24}$, Fig. 28, and are disposed in alinement therewith when the carriage $g$ has been shifted to the right, Fig. 29. One calculating member $g'$ is preferably provided for each controlling member E except the lefthand member E, each of the calculating members $g'$ is formed with opposite shoulders $g''$, Fig. 26, and each of said members $g'$ except the lefthand one is provided with additional opposite shoulders $g^{12}$, Figs. 26, 28 and 29. The outermost shoulder $g^{10}$ of each of the similar parts or halves of said calculating members $g'$ may be termed "space" shoulder, the next adjacent shoulder "zero" shoulder, and the remaining shoulders successively "1 to 9" shoulders. Said "space" and "zero" shoulders of each similar part or half of one of the calculating members $g'$ are both provided upon a portion of the periphery of the calculating member equaling the amount of said periphery advanced by a single step of the calculating member, and during its complete revolution said calculating member makes twenty steps or advances. The shoulders $g^{12}$ coöperate with cam-shaped shoulders $e^{25}$, Fig. 3 upon the rear ends of the controlling members E, are reciprocally movable through the calculating members $g'$ and are connected to flat springs $g^{120}$ which permit said shoulders to yield laterally if engaged by the controlling members when returning to their normal position.

As here illustrated, Fig. 4, the means for rotating the calculating members $g'$ consists of pinions $g^{13}$ and levers $g^{14}$, one pinion and one lever being provided for each of the calculating members. The pinions $g^{13}$ are connected to the calculating members $g'$ so as to permit said pinions to rotate rearwardly without transmitting motion to the calculating members and to cause said pinions to advance the calculating members when returning or moving forwardly. The connections between the pinions $g^{13}$ and the calculating members $g'$ are here shown as ratchet-wheels $g^{15}$, Fig. 4, secured to the pinions, and the pawls $g^{16}$ secured to the calculating members and engaging the wheels $g^{15}$. Said pinions $g^{13}$ are rotated by the toothed surfaces or parts of the recording members, are normally disengaged from said surfaces, and are normally arranged in position to be engaged by the recording members. In order that the recording members may engage with the pinions $g^{13}$ without any liability of their toothed surfaces or parts binding upon the pinions and not properly registering therewith, the teeth $d^4$ of said surfaces nearest the pinions $g^{13}$ are free to yield from said pinions and are prevented from yielding in the opposite direction, Figs. 4, 32 and 33. The levers $g^{14}$ are pivoted to the carriage, are held in their normal position by springs $g^{17}$, and are provided with fixed shoulders $g^{18}$, and each of said levers except the last two at the left is provided with a yielding pawl $g^{19}$, Fig. 26.

In the preferable embodiment of my invention, the means for effecting and controlling the return movement of the calculating members $g'$ consists of springs $g^{20}$, Fig. 26, pawls $g^{21}$, Fig. 3, means for operating the pawls $g^{21}$, and means for temporarily restraining the pawls from assuming their operative position. Corresponding ends of the springs $g^{20}$ are fixed to the calculating members $g'$ and their opposite ends are fixed to drums frictionally connected to the shaft $g^8$ by springs $g^{22}$ and capable of rotation on the shaft $g^8$ against the action of said springs $g^{22}$. The springs $g^{20}$ return the calculating members $g'$ to their normal position with corresponding shoulders $g''$ thereof in engagement with the upper faces of the shoulders $g^{18}$ of the levers $g^{14}$. Said calculating members are returned to their normal position whenever the desired total amount has been calculated or accumulated and upon the return of said members they are in their initial position to commence an additional calculation.

The pawls $g^{21}$ normally engage ratchet-wheels provided on the calculating members $g'$ and prevent retrograde movement of said members $g'$. The means for operating the pawls $g^{21}$ generally consists of springs $g^{23}$, Figs. 4 and 5, for holding the pawls in their operative position, and a rockshaft $g^{24}$ which is journaled in the carriage $g$, is formed with a flattened plate or extension $g^{25}$ for engaging the pawls $g^{21}$ and forcing the same from their operative position, and is also provided with an arm $g^{26}$, Figs. 3 and 24, having a lateral extension or shoulder $g^{27}$. Said arm $g^{26}$ is usually operated by a reciprocating bar $g^{28}$, Fig. 3, having one end arranged in the path of the shoulder $c^7$ of the actuating part C, and its other end provided with an upwardly extending arm $g^{29}$, Figs. 3 and 24, which is normally out of alinement with the shoulder $g^{27}$ and is movable into engagement with said shoulder $g^{27}$ when the carriage $g$ has been moved laterally by the depression of the key $b'$. It is sometimes desirable to prevent the actuating part C from moving the reciprocating bar $g^{28}$ and forcing the pawls $g^{21}$ from their operative position when the operator wishes to know or record the total amount accumulated but intends to add thereto. I accomplish this result by suitable means which connects the front end of the bar $g^{28}$ to the key $b^2$, and is here shown, Fig. 3, as consisting of a lever $g^{30}$ having one end connected to the bar $g^{28}$ and its other end connected to the key $b^2$. When the key $b^2$ is depressed, the lever $g^{30}$ elevates the front end of the bar $g^{28}$ out of the path of the shoulder $c^7$, and thus prevents the actuating part C from forcing the pawls $g^{21}$ from their operative position.

As best seen in Fig. 3, the means for temporarily restraining the pawls $g^{21}$ from assuming their operative position preferably consists of a lever $g^{31}$ having a substantially hook-shaped arm for engaging a shoulder $g^{32}$ of the arm $g^{26}$ and holding said arm $g^{26}$ in its position assumed when rocking the pawls $g^{21}$ out of operative position. The lever $g^{31}$ is connected by a link $g^{33}$ with an arm provided on the shaft $e^6$, and, consequently, at the commencement of the operation of the actuating part C, said link $g^{33}$ rocks the lever $g^{31}$ from its normal position, whereupon the pawls $g^{21}$ are immediately drawn into their operative position by the springs $g^{23}$.

The operation of my calculating mechanism is as follows:—After the keys $b$ are set for a predetermined number, say, 20, and the actuating part C commences its operation the controlling members coöperating with the units and tens series of keys are actuated, as previously described, to move the corresponding recording members, so that the number 20 will be set up and printed. In effecting this movement, the controlling member coöperating with the units series of keys, makes a single advance, and the next adjacent controlling member makes three advances. The single advance of the first controlling member moves the corresponding recording member into position to engage the pinion $g^{18}$ coöperating therewith, but as this controlling member makes no additional advance or step, no movement of said pinion and the calculating member $g'$ rotated thereby takes place. Upon the movement of the controlling member corresponding to the tens series of keys, the pinion $g^{18}$ next to the left of the former pinion is rotated rearwardly two steps. As the actuating part C completes its operation or rotation, the controlling and recording members previously moved from their normal position are returned. During the return of the two recording members used in setting up the predetermined number 20, the calculating member corresponding to the controlling member coöperating with the tens series of keys is rotated forwardly two steps, thus moving its "2" shoulder in position to be engaged by the shoulder $e^{24}$ of said controlling member, when the carriage $g$ is moved laterally, and the total amount is set up or recorded. When the keys $b$ are again set for a predetermined number, say 30, a similar operation of the controlling and recording members, previously operated, takes place, and as the recording member which formerly advanced its corresponding calculating member two steps is returning to its normal position after the second operation thereof, it advances said calculating member three steps.

Let it be supposed that it is now desired to set up and print the total amount of 50 accumulated by the calculating mechanism. The "total" key $b'$ is depressed forcing the carriage $g$ laterally to the right, and moving from operative position all but the lefthand one of each of the movable parts or levers $e^{12}$ $e^{13}$, for limiting the movement of the corresponding controlling members E. As said parts $e^{12}$ are forced from their normal position, the springs $e^{10}$ move the connections $e^9$ of the corresponding power-transmitting devices $e^3$ into their operative position, and upon the commencement of the movement of the actuating part C, all but the lefthand one of the controlling members E are released and the corresponding springs $d'$ immediately move said controlling members rearwardly into engagement with the calculating members coöperating therewith. All of the controlling members to the left of the controlling member coöperating with the tens series of keys will engage their shoulders $e^{24}$ with the "space" shoulders of the corresponding calculating members, and consequently, said controlling members will not operate the corresponding recording members to set up or aline any of the characters thereof with the printing point. The controlling member E coöperating with the tens series of keys $b$ will engage its shoulder $e^{24}$ with the "5" shoulder of the calculating member coöperating therewith, and, consequently, the corresponding recording member will be set to 5. At the commencement of the movement of the latter controlling member E, its shoulder $e^{25}$ will engage the shoulder $g^{12}$ of the calculating member coöperating with the controlling member next to the right of said moving controlling member, and will advance said calculating member a part of its first step so that its "zero" shoulder will be alined with the shoulder $e^{24}$ of the corresponding controlling member or the one to the right of the moving member E, and the pawl $g^{21}$ for said calculating member will hold the same in its adjusted position. It will thus be noted, that the two recording members to the right will set up or register 50 at the printing point, whereupon 50 will be printed as the total amount calculated or accumulated by the machine. As any of the calculating members $g'$, except the two at the lefthand, reaches the limit of a half revolution, one of its shoulders $g''$ engages the under face of the shoulder $g^{18}$ on the lever $g^{14}$ next to the left, and elevates said lever a limited distance for advancing a single tooth the calculating member $g'$ next to the left. After the shoulder $g''$ has passed beyond the shoulder $g^{18}$, the spring $g^{17}$ returns the lever $g^{14}$, and the pawl $g^{19}$ yields freely to permit the return of said lever.

The printing mechanism, Figs. 1, 2, 3 and 30 preferably consists of a support H for a record-sheet, means for moving the support toward and away from the recording members D, and means for feeding the record-sheet and the inking ribbon. Said support H is of any desirable form, size and construction, is movable lengthwise of separated shafts $h$ $h'$, Figs. 1, 2 and 3, which are secured in the arms $a^4$ and form guides for said support and is pivoted on the shaft $h$. The movement of the support H along the shafts $h$ $h'$ may be limited by a lever $h^2$, Figs. 1 and 30, pivoted to the support H and movable into annular grooves $h^3$ in the shaft $h$. As here illustrated, the means for moving the support H toward and away from the recording members D consists of the shaft $h'$ and means for operating the same. Said shaft $h'$ is eccentrically journaled, Fig. 3, in the arms $a^4$ and serves to move the corresponding portion of the support H toward and away from the contiguous part of the frame A, thus moving the printing point of said support toward and away from the characters of the recording members D registered with said printing point. The shaft $h'$ is operated by a segmental wheel $h^4$ fixed thereto and a reversely-moving segment $h^5$ meshing with the wheel $h^4$ and pivoted at $h^6$. The lower end of the reversely-moving segment $h^5$ is connected to a spring $h^7$ for rocking said part in one direction against a stop $h^8$, and is provided with a shoulder $h^9$ and with a rearwardly-extending arm having a vertically-adjustable shoulder $h^{10}$. Said part $h^5$ coöperates with and is normally disengaged from a catch $h''$ which is pivoted at its front end to a lever $h^{12}$ and is connected to a spring $h^{13}$ for forcing upwardly the free engaging end of the catch. The lever $h^{12}$ is held in its normal position by a shoulder $h^{14}$ on the frame A, and is connected to a spring $g^{15}$ of greater strength than the spring $h^7$. As the actuating part moves from its operative position the shoulder $c^7$ rocks the lever $h^{12}$ and moves the catch $h''$ forwardly into engagement with the shoulder $h^9$. Immediately after the recording members D have assumed their predetermined position, the shoulder $c^7$ passes out of engagement with the lever $h^{12}$, whereupon the spring $h^{15}$ connected thereto moves the part or segment $h^5$ in one direction against the action of the spring $h^7$, and by rotating the eccentric shaft $h'$ brings the printing point of the support H into position to effect the printing of the record thereon from the characters registered with said printing point. After the record is printed, the shoulder $h^{10}$ of the part or segment $h^5$ encounters the catch $h''$ and rocks the same out of engagement with the shoulder $h^9$, whereupon the spring $h^7$ reversely moves the part or segment $h^5$ and returns the support H to its normal position.

The means for feeding the record-sheet is of any desirable form, size and construction, being here shown as a ratchet-wheel $h^{16}$, Fig. 3, fixed to a roller forming part of the support H and engaging the record-sheet for feeding the same, a pawl $h^{17}$ engaging said ratchet-wheel, an arm $h^{18}$ which supports the pawl $h^{17}$, is keyed to the shaft $h$, and is movable lengthwise of said shaft with the support H, a depending arm $h^{19}$ fixed to said shaft, a rocking arm $h^{20}$ engaging the arm $h^{19}$ and fixed to a rock-shaft $h^{21}$, and an arm $h^{22}$ depending from the rock-shaft $h^{21}$ and connected to the reciprocating bar $g^{28}$. The inking ribbon-feed may also be of any suitable form, size and construction, and is here shown as a ratchet-wheel $h^{23}$ connected to one of the rollers for said ribbon, a pawl $h^{24}$ engaging said ratchet-wheel and an arm $h^{25}$ fixed to the shaft $h^{21}$.

In Fig. 34, I have illustrated the lower ends of keys $b^{50}$ having shoulders $b^{51}$ which enter right-angular notches $e^{50}$ in the movable parts or levers $e^{51}$ coöperating with said keys and thus lock the keys when depressed to the corresponding movable parts or levers; and in Fig. 35 I have shown the rear end of a controlling member $E^{50}$ connected to the corresponding recording member $D^{50}$ by a link $d^{50}$. These are, however, only two of many modifications of my invention which will be obvious to those skilled in the art.

The construction and operation of my calculating machine will now be readily understood upon reference to the foregoing description and the accompanying drawing, and it will be evident that more or less change may be made in the component parts thereof without departing from the spirit of my invention.

Having thus fully described my invention, what I claim as new and desire to secure by Letters Patent, is:

1. In a calculating machine, a key, a recording member, a movable controlling member for governing the setting of the recording member, a movable part between the key and the controlling member for limiting the movement of the controlling member, said movable part being movable relatively to the key, and means for connecting the key and the movable part and thereby returning the movable part with the key, said means being normally in inoperative position, substantially as described.

2. In a calculating machine, a key, a recording member, a movable controlling member for governing the setting of the recording member, a movable part between the key and the controlling member for limiting the movement of the controlling member, said movable part being movable relatively to the key, and means secured to the key and detachably engaging the movable part for returning the movable part with the key, said means being normally disengaged from the movable part, substantially as described.

3. In a calculating machine, the combination with two members, one comprising a key, and the other, movable means coöperating with the key; of movable means connected to one of the two members and detachably engaging the other of said members for returning one member with the other, said latter movable means being normally disengaged from the member with which said latter movable means detachably engages, substantially as described.

4. In a calculating machine, a recording member, a movable controlling member for governing the setting of the recording member, a part movable relatively to the controlling member into a plurality of operative positions for limiting the movement of the controlling member into a plurality of positions, a series of keys coöperating with the movable part for effecting the movement of said movable part into the predetermined position of a plurality of operative positions and thereby determining the position to be assumed by the controlling member, means for moving the controlling member relatively to the movable part into a plurality of operative positions, means for preventing the movement of the controlling member from its normal position, and means coöperating with the key to force the latter means from its operative position, substantially as and for the purpose specified.

5. In a calculating machine, a key, a recording member, a stop, a movable controlling member movable means between the key and the controlling member, said means coöperating with the key and the controlling member for governing the setting of the recording member, said controlling member being movable relatively to the stop into and out of operative engagement therewith, means for holding the controlling member in its normal position in engagement with the stop connections between the key and the controlling member, and means movable independently of the key for forcing the former means from its operative position, substantially as and for the purpose set forth.

6. In a calculating machine, a key, a recording member, a fixed stop, a movable controlling member, movable means between the key and the controlling member, said means coöperating with the key and the controlling member for governing the setting of the recording member, said controlling member being movable relatively to the stop into and out of operative engagement therewith, a spring for moving the controlling member into the predetermined position, means for holding the controlling member in its normal position in engagement with the stop and thereby preventing the movement of the controlling member by the spring, connections between the key and the controlling member, and means movable independently of the key for forcing the former means from its operative position, substantially as and for the purpose described.

7. In a calculating machine, a key, a recording member, a stop, a longitudinally-movable controlling member, movable means between the key and the controlling member, said means coöperating with the key and the controlling member for governing the setting of the recording member, said controlling member having one end pivotally supported and its other end movable into and out of engagement with the stop in a plane disposed at substantially right angles with the plane of the longitudinal movement of the controlling member, means for holding the controlling member in its normal position in engagement with the stop, and means coöperating with the key to force the former means from its operative position, substantially as and for the purpose specified.

8. In a calculating machine, a key, a recording member, a stop, a longitudinally-movable controlling member, movable means between the key and the controlling member, said means coöperating with the key and the controlling member for governing the setting of the recording member, said controlling member having one end pivotally supported and its other end movable into and out of engagement with the stop, a lever for holding the controlling member in its normal position in engagement with the stop, rocking power-transmitting means for forcing the lever from its operative position, and means for operating said power-transmitting means, substantially as and for the purpose set forth.

9. In a calculating machine, a key, a recording member, a movable controlling member for governing the setting of the recording member, means for normally holding the controlling member from movement, means for releasing the controlling member from the holding means, a movable part operated by the key and coöperating with the releasing means for controlling the operation of the releasing means, and an actuating part movable independently of the former part for actuating the releasing means after the same has been acted on by the former part, substantially as and for the purpose described.

10. In a calculating machine, a key, a recording member, a movable controlling member, movable means coöperating with the key and the controlling member for governing the setting of the recording member, means for governing the movement of the controlling member from its normal position, an actuating part movable independently of the key, and means coöperating with the key, the former means and the actuating part for effecting the transmission of power from the actuating part to said former means after the key is actuated, substantially as and for the purpose specified.

11. In a calculating machine, a key, a recording member, a movable controlling member, movable means coöperating with the key and the controlling member for governing the setting of the recording member, means for governing the movement of the controlling member from its normal position, an actuating part, and a power-transmitting device consisting of a section for forcing said means from its operative position, a second section operated by the actuating part and normally movable independently of the former section, and a connection between the sections coöperating with the key for locking the sections together, substantially as and for the purpose set forth.

12. In a calculating machine, a key, a recording member, a movable controlling member, movable means coöperating with the key and the controlling member for governing the setting of the recording member, means for governing the movement of the controlling member from its normal position, an actuating part, a power-transmitting device consisting of a section for forcing said means from its operative position, a second section operated by the actuating part and normally movable independently of the former section, and a connection between the sections for transmitting motion from one to the other, said connection being movable automatically into its operative position, and means between the key and said connection for normally forcing the connection from its operative position, substantially as and for the purpose described.

13. In a calculating machine, a key, a recording member, a movable controlling member coöperating with the key for governing the setting of the recording member, means for governing the movement of the controlling member from its normal position, an actuating part, a power-transmitting device consisting of a rocking section for forcing said means from its operative position, a second rocking section operated by the actuating part and normally movable independently of the former section, a connection between the sections for transmitting motion from one to the other, and a spring for forcing the connection into its operative position, and means between the key and said connection for normally forcing the connection from its operative position, substantially as and for the purpose specified.

14. In a calculating machine, a series of keys, a recording member, a movable controlling member for governing the setting of the recording member, means for governing the movement of the controlling member from its normal position, an actuating part, a power-transmitting device consisting of a section for forcing said means from its operative position, a second section operated by the actuating part and normally movable independently of the former section, and a connection between the sections for transmitting motion from one to the other, said connection being movable automatically into its operative position, and a lever coöperating with the keys and normally forcing the connection from its operative position, said lever having its axis arranged at one end of the series of keys, substantially as and for the purpose set forth.

15. In a calculating machine, a series of keys, a recording member, a movable controlling member for governing the setting of the recording member, means for governing the movement of the controlling member from its normal position, an actuating part, power-transmitting means between the former means and the actuating part for effecting the movement of the controlling member from its normal position, and means coöperating with the keys for limiting the movement of the controlling member and coöperating with the power-transmitting means for controlling the transmission of power to said means for governing the movement of the controlling member, substantially as and for the purpose described.

16. In a calculating machine, a series of keys, a recording member, a movable controlling member for governing the setting of the recording member, means for governing the movement of the controlling member for its normal position, an actuating part, power-transmitting means between the former means and the actuating part for effecting the movement of the controlling member from its normal position, means for limiting the movement of the controlling member, and a movable part coöperating with the keys for controlling the operation of the means for limiting the movement of the controlling member and coöperating with the power-transmitting means for controlling the transmission of power to said means for governing the movement of the controlling member, substantially as and for the purpose specified.

17. In a calculating machine, a series of keys, a recording member, a movable controlling member for governing the setting of the recording member, means for governing the movement of the controlling member from its normal position, an actuating part, a power-transmitting device consisting of a section for forcing said means from its operative position, a second section operated by the actuating part and normally movable independently of the former section, and a connection between the sections for transmitting motion from one to the other, said connection being movable automatically into its operative position, means for limiting the movement of the controlling member, and a lever coöperating with the keys for controlling the operation of the means for limiting the movement of the controlling member and coöperating with the connection of the power-transmitting device for controlling the transmission of power to said means for governing the movement of the controlling member, said lever having its axis arranged at one end of the series of keys, substantially as and for the purpose set forth.

18. In a calculating machine, a key, a recording member, a movable controlling member coöperating with the key for governing the setting of the recording member, and a power-transmitting device consisting of a section coöperating with the controlling member, a second section normally movable independently of the former section, and means for connecting said sections together, substantially as and for the purpose described.

19. In a calculating machine, a plurality of series of keys, recording members, one for each series of keys, controlling members, one for each series of keys, for governing the setting of the recording members, movable means between one series of keys and the corresponding controlling member movable relatively to said controlling member for effecting the movement thereof, an actuating part movable relatively to the keys for operating said means, and means coöperating with the former means for effecting the movement of an additional controlling member, substantially as and for the purpose specified.

20. In a calculating machine, recording members, controlling members for governing the setting of the recording members, movable means for normally permitting the controlling members to make a single advance and for limiting the subsequent advance-movements of the controlling members, a plurality of series of keys, one series for each controlling member, coöperating with the movable means for determining the positions to be assumed by the controlling members, means for moving the controlling members relatively to said movable means into a plurality of positions, movable means between one series of keys and the corresponding controlling member for governing the movement of said controlling member from its normal position, and means coöperating with the latter movable means for effecting the movement of an additional controlling member, substantially as and for the purpose set forth.

21. In a calculating machine, a plurality of series of keys, recording members, one for each series of keys, stops, controlling members, one for each series of keys, for governing the setting of the recording members, means for moving the controlling members from their normal position, independently-operating means for holding the controlling members in engagement with the stops and preventing the movement of the controlling members from their normal position, means coöperating with one series of keys for effecting the movement from its operative position of one of the independently-operating means, and means provided on said one of the independently-operating means for actuating another of said independently-operating means, substantially as and for the purpose described.

22. In a calculating machine, a plurality of series of keys, recording members, one for each series of keys, stops, controlling members, one for each series of keys for governing the setting of the recording members, said controlling members having corresponding ends pivotally supported and their other ends movable into and out of engagement with the stops, means for moving the controlling members from their normal position, rocking independently-operating means for holding the controlling members in engagement with the stops, one of said independently-operating means being provided with a laterally extending arm for actuating another of the independently-operating means, and means coöperating with one series of keys for effecting the movement from its operative position of one of the independently-operating means, substantially as and for the purpose specified.

23. In a calculating machine, a plurality of series of keys, recording members for the series of keys, controlling members for governing the setting of the recording members, each controlling member coöperating with one series of keys and one recording member, an actuating part, independently-operating means for governing the movement of the controlling members from their normal position, independently-operating means coöperating with the keys for connecting the former means with the actuating part, and means for connecting together two of the former independently-operating means and effecting the operation of two of the controlling members, substantially as and for the purpose set forth.

24. In a calculating machine, a key, a recording member, a movable controlling member for governing the setting of the recording member in the predetermined position, means for moving the controlling member into its operative position, and additional means for moving the controlling member into its operative position after the same has governed the setting of the recording member in the predetermined position and thereby positively arranging the recording member in said predetermined position, substantially as and for the purpose described.

25. In a calculating machine, a key, a recording member, a movable controlling member for governing the setting of the recording member in the predetermined position, an actuating part, means movable independently of the actuating part for setting the recording member in the predetermined position, and means operated by the actuating part for moving the controlling member after the same has governed the setting of the recording member and thereby positively arranging the recording member in the predetermined position, substantially as and for the purpose specified.

26. In a calculating machine, recording members, movable controlling members for governing the setting of the recording members, parts movable relatively to the controlling members into a plurality of positions for limiting the movement of the controlling members, a plurality of series of keys coöperating with the movable parts for determining the positions to be assumed by the controlling members, means for moving the controlling members relatively to the movable parts into a plurality of operative positions, and a shaft provided with a plurality of arms arranged one in advance of the other, for returning the controlling members to their normal position, substantially as and for the purpose described.

27. In a calculating machine, recording members, movable controlling members for governing the setting of the recording members, said controlling members being each provided with a series of shoulders arranged in steps one below and in advance of the other and being also provided with teeth, movable parts coöperating with the shoulders for limiting the movement of the controlling members into a plurality of positions, a plurality of series of keys coöperating with the movable parts for determining the positions to be assumed by the controlling members, means for moving the controlling members relatively to the movable parts into a plurality of operative positions, and a shaft provided with a plurality of toothed arms for coöperating with the teeth of the controlling members and returning said controlling members to their normal position, substantially as and for the purpose set forth.

28. In a calculating machine, a key, a recording member, a longitudinally-movable controlling member coöperating with the key for governing the setting of the recording member, said controlling member having one end pivotally supported and its other end movable into and out of its position assumed when the controlling member has advanced from its normal position, and means for returning the controlling member to its normal position, said means being movable into engagement with the movable end of the controlling member when advanced from its normal position and being separated from said end of the controlling member when in its normal position, substantially as and for the purpose specified.

29. In a calculating machine, a key, a recording member, a longitudinally-movable controlling member coöperating with the key for governing the setting of the recording member, said controlling member having one end pivotally supported, means for raising the other end of the controlling member when advanced from its normal position, and a shaft provided with an arm for returning the controlling member to its normal position, said arm being movable into engagement with the movable end of the controlling member when raised from its normal position and being movable above said end of the controlling member out of operative engagement therewith when the controlling member is in its normal position, substantially as and for the purpose set forth.

30. In a calculating machine, a key, a recording member, a longitudinally-movable controlling member coöperating with the key for governing the setting of the recording member, said controlling member having one end pivotally supported and its other end movable into and out of its position assumed when the controlling member has advanced from its normal position, means for returning the controlling member to its normal position, said means being movable into engagement with the movable end of the controlling member when advanced from its normal position and being separated from said end of the controlling member when in its normal position, and means for preventing the movement of the controlling member from its normal position, substantially as and for the purpose described.

31. In a calculating machine, a key, a recording member, a longitudinally-movable controlling member coöperating with the key for governing the setting of the recording member, said controlling member having one end pivotally supported, means for raising the other end of the controlling member when advanced from its normal position, means for returning the controlling member to its normal position, said means being movable into engagement with the movable end of the controlling member when raised from its normal position and being movable above said end of the controlling member out of operative engagement therewith when the controlling member is in its normal position, and means for preventing said movable end of the controlling member from being raised out of its normal position, substantially as and for the purpose specified.

32. In a calculating machine, a key, a recording member, controlling mechanism coöperating with the key for governing the movement of the recording member into a predetermined position, and a pivoted locking member having means for engaging the key and holding the key in an operative position, said means being normally arranged out of its position assumed when holding the key in an operative position and movable into said position by the key and actuated directly by the key, and means independent of the key for forcing the former means into its original position from its position assumed when holding the key in operative position, substantially as and for the purpose described.

33. In a calculating machine, a key, a recording member, a controlling member coöperating with the key for governing the movement of the recording member into the predetermined position, and a pivoted locking member having engaging surfaces arranged on opposite sides of its pivot, one of the surfaces being movable by the key for forcing the other surface into position to hold the key in operative position, substantially as and for the purpose described.

34. In a calculating machine, a key provided with a pair of engaging surfaces, a recording member, a controlling member coöperating with the key for governing the movement of the recording member into the predetermined position, and a pivoted locking member having a plurality of engaging surfaces coöperating with the former surfaces for locking the key in its operative and inoperative positions, said locking member being normally arranged out of its position assumed when holding the key in an operative position, and said key having means for forcing the locking member from its normal position into said position for holding the key, substantially as and for the purpose specified.

35. In a calculating machine, a key provided with a pair of shoulders, a recording member, a controlling member coöperating with the key for governing the movement of the recording member into the predetermined position, and a pivoted locking member consisting of a lever having a pair of arms, one arm serving to engage one of the shoulders and lock the key in a predetermined position, and the other arm being normally arranged in the path of the other shoulder for rocking the first arm into its operative position, substantially as and for the purpose set forth.

36. In a calculating machine, a key, a recording member, a controlling member coöperating with the key for governing the movement of the recording member into the predetermined position, a locking member for holding the key in a predetermined position, said locking member being normally arranged out of its operative position assumed when holding the key in an operative position, and a spring for holding the locking member in either its normal or operative positions, substantially as and for the purpose described.

37. In a calculating machine, a key, a recording member, a controlling member coöperating with the key for governing the movement of the recording member into the predetermined position, a pivoted locking member for holding the key in a predetermined position, said locking member being provided with an arm, a spring, a support for the spring having one end pivotally supported and its other end pivoted to said arm, the pivot for uniting the contiguous ends of the arm and the support being movable on opposite sides of a line drawn through the axes of the locking member and the support, substantially as and for the purpose specified.

38. In a calculating machine, a key, a recording member, a controlling member coöperating with the key for governing the movement of the recording member into the predetermined position, a locking member for holding the key in a predetermined position, a pair of sliding bars arranged at an angle with each other, one of the sliding bars coöperating with the locking member for forcing the same from its operative position, an actuating part for operating the other sliding bar, and a lever connecting the sliding bars, substantially as and for the purpose set forth.

39. In a calculating machine, a key, a recording member, a controlling member coöperating with the key for governing the movement of the recording member into the predetermined position, a locking member for holding the key in a predetermined position, a spring for holding the locking member in either its operative or inoperative position, a pair of sliding bars arranged at an angle with each other, one of the sliding bars coöperating with the locking member, an actuating part for operating the other sliding bar, and a lever connecting the sliding bars, substantially as and for the purpose described.

40. In a calculating machine, a frame, a key movable into a plurality of positions and provided with a plurality of shoulders, a recording member, a controlling member, movable means coöperating with the key and the controlling member for governing the movement of the recording member into a predetermined position, and a yielding stop fixed to the frame and detachably engaging said shoulders for holding the key in different positions, substantially as and for the purpose set forth.

41. In a calculating machine, a frame, a series of keys and an additional key, said additional key being movable independently of the keys of said series into a plurality of positions, a recording member and a movable controlling member for governing the movement of the recording member into predetermined positions, a yielding stop fixed to the frame for holding said one of the keys in different positions, and locking members movable independently of said additional key and of the yielding stop and coöperating with keys of said series when one of the keys of said series is operated, and thereby preventing the movement of the remaining keys of said series, substantially as and for the purpose specified.

42. In a calculating machine, a series of keys, a recording member, a movable part, a controlling member movable relatively to the movable part into a plurality of operative positions for governing the setting of the recording member, said movable part coöperating with the series of keys and being movable relatively to the controlling member into a plurality of operative positions for limiting the movement of the controlling member into a plurality of positions, and said movable part being also movable relatively to the keys, locking means for holding the key in a predetermined position, means for releasing said key from the locking means, an actuating part having a movement for operating the releasing means, means for forcing the releasing means from its position assumed when about to be operated by the actuating part, and means for forcing the releasing means into said position, the latter means being movable step by step at each operation of the actuating part, substantially as and for the purpose specified.

43. In a calculating machine, a series of keys, a recording member, a movable part, a controlling member movable relatively to the movable part into a plurality of operative positions for governing the setting of the recording member, said movable part coöperating with the series of keys and being movable relatively to the controlling member into a plurality of operative positions for limiting the movement of the controlling member into a plurality of positions, and said movable part being also movable relatively to the keys, a recording member, means coöperating with the key for governing the movement of the recording member into the predetermined position, locking means for holding one of the keys in a predetermined position, means for releasing said key from the locking means, a rotary actuating part having a movement independently of the key and said means coöperating with the key for operating the releasing means, and means coöperating with the releasing means and the actuating part for permitting a predetermined number of said movements of the actuating part before said actuating part operates the releasing means, substantially as and for the purpose set forth.

44. In a calculating machine, a series of keys, a recording member, a movable part, a controlling member movable relatively to the movable part into a plurality of operative positions for governing the setting of the recording member, said movable part coöperating with the series of keys and being movable relatively to the controlling member into a plurality of operative positions for limiting the movement of the controlling member into a plurality of positions, and said movable part being also movable relatively to the keys, a locking member for holding one of the keys in a predetermined position, means for releasing said key from the locking member, said releasing means having a movable part, an actuating part having a movement for coöperating with said movable part to effect the release of the key from the locking member, and means coöperating with the movable part and the actuating part for permitting a predetermined number of said movements of the actuating part before the actuating part and the movable part coöperate to effect the release of the key, substantially as and for the purpose described.

45. In a calculating machine, a key, a locking member for holding the key in a predetermined position, means for releasing the key from the locking member, said releasing means having a movable part, an actuating part for coöperating with said movable part to effect the release of the key from the locking member, a spring for forcing the movable part of the releasing means from its position assumed when about to coöperate with the actuating part, and means for forcing the movable part of the releasing means against the action of the spring into said position, substantially as and for the purpose specified.

46. In a calculating machine, a key, a locking member for holding the key in a predetermined position, means for releasing the key from the locking member, said releasing means having a movable part, an actuating part for coöperating with said movable part to effect the release of the key from the locking member, means for forcing the movable part of the releasing means from its position assumed when about to coöperate with the actuating part, and a rotary member for forcing the movable part of the releasing means into said position, substantially as and for the purpose set forth.

47. In a calculating machine, a key, a locking member for holding the key in a predetermined position, means for releasing the key from the locking member, said releasing means having a movable part, an actuating part for coöperating with said movable part to effect the release of the key from the locking member, means for forcing the movable part of the releasing means from its position assumed when about to coöperate with the actuating part, a rotary member for forcing the movable part of the releasing means into said position, the rotary member being movable by hand in one direction, and connections between the actuating part and the rotary member for moving said rotary member in the opposite direction step by step, substantially as and for the purpose described.

48. In a calculating machine, a key, a locking member for holding the key in a predetermined position, means for releasing the key from the locking member, said releasing means having a movable part, an actuating part for coöperating with said movable part to effect the release of the key from the locking member, means for forcing the movable part of the releasing means from its position assumed when about to coöperate with the actuating part, a movable member for forcing the movable part of the releasing means into said position, and an escapement for controlling the movement of the movable member, substantially as and for the purpose specified.

49. In a calculating machine, a key, a locking member for holding the key in a predetermined position, means for releasing the key from the locking member, said releasing means having a movable part, an actuating part for coöperating with said movable part to effect the release of the key from the locking member, means for forcing the movable part of the releasing means from its position assumed when about to coöperate with the actuating part, a movable member for forcing the movable part of the releasing means into said position, an escapement for controlling the movement of the movable member, and means movable with the actuating part for operating the escapement, substantially as and for the purpose set forth.

50. In a calculating machine, a series of keys, a recording member, a movable part, a controlling member movable relatively to the controlling member into a plurality of operative positions for limiting the movement of the controlling member into a plurality of positions, and said movable part being also movable relatively to the keys, a locking member for holding one of the keys in a predetermined position, means for releasing said key from the locking member, an actuating part having a movement independently of the keys and said movable part for operating the releasing means, and means coöperating with the releasing means and the actuating part for permitting a predetermined number of said movements of the actuating part before said actuating part operates the releasing means, substantially as and for the purpose specified.

51. In a calculating machine, a key, a locking member for holding the key in a predetermined position, means for releasing the key from the locking member, said releasing means having a movable part, a rotary actuating part for coöperating with the movable part of the releasing means, a spring for forcing said movable part of the releasing means from its normal position, a rotary member for forcing the movable part of the releasing means into said position, the rotary member being movable by hand from its normal position, a spring for returning the rotary member to its normal position, an escapement for controlling the movement of the rotary member to its normal position, and means revoluble with the actuating member for operating the escapement, substantially as and for the purpose set forth.

52. In a calculating machine, a series of keys, a movable controlling member means actuated by the keys for stopping the controlling member in different positions in accordance with the denomination of the key operated, and a calculating member controlled in its operation by the movement of the controlling member, the calculating member having a series of stops for limiting the movement of the controlling member, said member being normally in positions whereby the calculating member is actuated by the movement of the controlling member and whereby the stops of the calculating and the controlling members are out of position to coöperate, and means for effecting relative movement of said members, whereby the stops of the calculating member and the controlling member are brought into position to coöperate, substantially as and for the purpose specified.

53. In a calculating machine, a series of keys, a controlling member having a series of shoulders arranged in steps, a member common to all the keys of the series and operable by any one of the keys of the series for coöperating with the series of stops of the controlling member and stopping the controlling member in different positions in accordance with the denomination of the key operated, a calculating member controlled in its movement by the movement of the controlling member, the calculating member having a series of stops for limiting the movement of the controlling member, and said calculating member being normally in position to be actuated by the movement of the controlling member, and with its stops out of position to coöperate with the controlling member, and means for shifting the calculating member out of its normal position bringing the stops into position to coöperate with the controlling member, and also for moving the stopping member operated by the series of keys out of its operative position, substantially as and for the purpose set forth.

54. In a calculating machine, a series of keys, a recording member, a movable controlling member for governing the setting of the recording member, means coöperating with the keys for limiting the movement of the controlling member, means for moving the former means and thereby preventing said former means from limiting the movement of the controlling member, and a calculating member for limiting the movement of the controlling member when said means coöperating with the keys is prevented from limiting the movement of said controlling member, substantially as described.

55. In a calculating machine, a recording member, a movable controlling member for governing the setting of the recording member, a calculating member for limiting the movement of the controlling member, said calculating member being normally out of position to limit the movement of the controlling member, and means for forcing the calculating member into position to limit the movement of the controlling member, substantially as and for the purpose specified.

56. In a calculating machine, a series of keys, a recording member, a controlling member for governing the setting of the recording member, means coöperating with the keys and engaging one end of the controlling member for limiting the movement of the controlling member, means for moving the former means and thereby preventing said former means from limiting the movement of the controlling member, and a calculating member having means for engaging the other end of the controlling member and limiting the movement of the controlling member when said means coöperating with the keys is prevented from limiting the movement of said controlling member, substantially as described.

57. In a calculating machine, a recording member, a controlling member for governing the setting of the recording member, calculating mechanism having means for limiting the movement of the controlling member, said means being normally out of position to limit the movement of the controlling member, and means for forcing said means of the calculating mechanism laterally into position to limit the movement of the controlling member, substantially as and for the purpose described.

58. In a calculating machine, a recording member, a toothed part movable with the recording member, a calculating mechanism provided with teeth normally disconnected from the toothed part and movable into engagement therewith, and means for preventing binding of said toothed part and teeth at the commencement of their engagement with each other, substantially as and for the purpose specified.

59. In a calculating machine, a recording member, a toothed part movable with the recording member, a calculating mechanism provided with teeth normally disconnected from the toothed part and movable into engagement therewith, one of said teeth of the calculating mechanism being yielding in one direction and prevented from movement in the other direction, substantially as and for the purpose set forth.

60. In a calculating machine, a recording member, a toothed part movable with the recording member, a movable controlling member having teeth normally engaging the toothed part, a calculating member, a wheel coöperating with the toothed part, and connections between the wheel and the calculating member for advancing the calculating member as the wheel is moved in one direction and for permitting the wheel to move independently of the calculating member in the other direction, substantially as and for the purpose described.

61. In a calculating machine, a recording member, a toothed part movable with the recording member, a rotary calculating member, a toothed wheel normally disconnected from said toothed part and movable thereby in reverse directions, and connections between the toothed wheel and the calculating member for advancing the calculating member as said wheel is moved in one direction and for permitting the toothed wheel to move independently of the calculating wheel in the other direction, substantially as and for the purpose set forth.

62. In a calculating machine, a recording member, a calculating member, means for actuating the calculating member, said means being normally arranged in position to coöperate with the recording member, a movable carriage for the calculating member and said means, and means for moving the carriage and forcing said means out of position to coöperate with the recording member, substantially as and for the purpose described.

63. In a calculating machine, a recording member, means for governing the setting of the recording member, a calculating member for coöperating with said means, the calculating member being normally arranged out of position to cooperate with said means, a movable carriage for the calculating member, and means for moving the carriage and forcing the calculating member into position to coöperate with said means, substantially as and for the purpose specified.

64. In a calculating machine, a recording member, a controlling member for governing the setting of the recording member, calculating mechanism having means normally in position to coöperate with the controlling member for setting the calculating mechanism and having means for limiting the movement of the controlling member, said latter means being normally out of position to limit the movement of the controlling member, a carriage for the calculating mechanism, and means for moving the carriage and forcing the first means of the calculating mechanism out of operative position and the latter means of said mechanism into its operative position, substantially as and for the purpose set forth.

65. In a calculating machine, a key, a recording member, a controlling member for governing the setting of the recording member, means coöperating with the key for limiting the movement of the controlling member, a calculating member for limiting the movement of the controlling member, said calculating member being normally out of position to limit the movement of the controlling member, a movable carriage for the calculating member, and means for forcing the former means out of its operative position and for moving the carriage to force the calculating member into position to limit the movement of the controlling member, substantially as and for the purpose described.

66. In a calculating machine, a key, a recording member, a controlling member for governing the setting of the recording member, a movable part between the key and the controlling member for limiting the movement of said controlling member, a calculating member for limiting the movement of the controlling member, said calculating member being normally out of position to limit the movement of the controlling member, a laterally-movable carriage for the calculating member, and means for forcing the movable part out of its operative position and for moving the carriage laterally to force the calculating member into position to limit the movement of the controlling member, substantially as and for the purpose specified.

67. In a calculating machine, a key, a recording member movable independently of the key, a calculating member coöperating with the recording member, a laterally-movable carriage for the calculating member, a rocking shaft provided with means for moving the carriage laterally, and means for actuating the rocking shaft, substantially as and for the purpose described.

68. In a calculating machine, a key, a locking member for holding the key in a predetermined position, means for releasing the key from the locking member, a controlling member coöperating with the key, a calculating member for limiting the movement of the controlling member, said calculating member being normally out of position to limit the movement of the controlling member, means for forcing the calculating member into position to limit the movement of the controlling member, and connections between the releasing means and the latter means, substantially as and for the purpose set forth.

69. In a calculating machine, a calculating member, a lever provided with a pawl for moving said member step by step, the lever being also provided with a shoulder, a second calculating member having means engaging the shoulder for operating the lever and for limiting the return movement of said second calculating member, and means for returning the second calculating member to its normal position, substantially as and for the purpose described.

70. In a calculating machine, a key, a calculating member provided with a shoulder, a controlling member coöperating with the key and having means for engaging the shoulder and moving the calculating member, substantially as and for the purpose described.

71. In a calculating machine, a calculating member, means for advancing the calculating member intermittently, a controlling member provided with means for advancing the calculating member independently of the former means and a spring for returning the calculating member to its normal position, substantially as and for the purpose set forth.

72. In a calculating machine, a calculating member, a shaft, means for advancing the calculating member intermittently, a spring for returning the calculating member to its normal position, and means for frictionally securing the spring to the shaft, and for permitting the portion of the spring secured to the shaft to move with the calculating member relatively to the shaft, substantially as and for the purpose specified.

73. In a calculating machine, a calculating member, means for returning the calculating member to its normal position, a pawl for preventing the return of the calculating member, an actuating part, and connections between the actuating part and the pawl for forcing the pawl from its operative position, substantially as and for the purpose described.

74. In a calculating machine, a calculating member, means for returning the calculating member to its normal position, a pawl for preventing the return of the calculating member, a movable carriage for the calculating member and the pawl having means for forcing the pawl from its operative position, a reciprocating bar for actuating said means, means for moving the carriage and arranging the former means in position to coöperate with the reciprocating bar, and a rotary actuating member for moving the bar, substantially as and for the purpose specified.

75. In a calculating machine, a calculating member, means for returning the calculating member to its normal position, a pawl for preventing the return of the calculating member, an actuating part, connections between the actuating part and the pawl for forcing the pawl from its operative position, and means for temporarily preventing the return of the pawl to its operative position, substantially as and for the purpose set forth.

76. In a calculating machine, a calculating member, means for returning the calculating member to its normal position, a pawl for preventing the return of the calculating member, an actuating part, connections between the actuating part and the pawl for forcing the pawl from its operative position, means for temporarily preventing the return of the pawl to its operative position, and connections between the actuating part and the latter means for forcing said latter means from its operative position, substantially as and for the purpose described.

77. In a calculating machine, a calculating member, means for returning the calculating member to its normal position, a pawl for preventing the return of the calculating member, an actuating part, connections between the actuating part and the pawl for forcing the pawl from its operative position, and means for preventing the operation of said connections by the actuating part, substantially as and for the purpose specified.

78. In a calculating machine, a calculating member, means for returning the calculating member to its normal position, means for preventing the return of the calculating member, an actuating part, a movable part connected to the means for preventing the return of the calculating member and operated by the actuating part, and a key connected to the movable part for moving the same out of its position assumed when operated by the actuating part, substantially as and for the purpose described.

79. In a calculating machine, a frame, a recording member, a support for a record-sheet, said support being movable toward and away from the recording member, a shaft eccentrically journaled in the frame and connected to the support for moving the same toward and away from the recording member, and means for moving the shaft, substantially as and for the purpose specified.

80. In a calculating machine, a recording member, a support for a record-sheet, a reversely-movable part for forcing the support toward and away from the recording member, a spring for moving the reversely-movable part in one direction, a spring for moving said part in the other direction against the action of the first spring, said latter spring being normally disconnected from the reversely-movable part, and means for connecting the reversely-movable part to the second spring, substantially as and for the purpose set forth.

81. In a calculating machine, a recording member, a support for a record-sheet, a reversely-movable part for forcing the support toward and away from the recording member, means for moving the reversely-movable part in one direction, a catch for moving said part in the other direction, and means provided on the reversely-movable part for forcing the catch out of operative relation therewith, substantially as and for the purpose described.

82. In a calculating machine, a key, a controlling member movable relatively to the key, a roller for feeding a record-sheet, a rock-shaft, a pawl operated by the rock shaft for actuating the roller, the pawl being movable lengthwise of the rock shaft, and means for actuating said shaft, substantially as and for the purpose specified.

83. In a calculating machine, a key, a recording member, calculating mechanism, a rotary actuating part having a peripheral engaging face, and a pivoted pawl having a concave face for frictionally engaging said peripheral face, the pawl being of greater length than the distance in a radial line between its pivot and the periphery of the actuating part, substantially as and for the purpose specified.

84. In a calculating machine a series of keys, a recording member, a movable controlling member for governing the setting of the recording member, a movable part between a series of keys and the controlling member for limiting the movement of said controlling member, said part being common to all of the keys of the series, a spring normally tending to actuate the controlling member, means normally locking the controlling member by the spring, and means operated by any one of the keys, for releasing the locking means, substantially as set forth.

85. In a calculating machine a series of keys, a recording member, a movable controlling member for governing the setting of the recording member, means between the series of keys and the controlling member for limiting the movement of the controlling member in positions corresponding to the key operated, means tending to actuate the controlling member, means for normally limiting the controlling member from actuation by the last mentioned means, and means for releasing the locking means upon the operation of each key.

In testimony whereof, I have hereunto signed my name in the presence of two attesting witnesses, at Syracuse, in the county of Onondaga, in the State of New York, this 26th day of July, 1902.

WILLARD LE GRAND BUNDY.

Witnesses:
D. LAVINE,
S. DAVIS.

Copies of this patent may be obtained for five cents each, by addressing the "Commissioner of Patents, Washington, D. C."